United States Patent
Yu et al.

(10) Patent No.: US 12,549,437 B2
(45) Date of Patent: Feb. 10, 2026

(54) NETWORK CONFIGURATION METHOD AND APPARATUS FOR INTELLIGENT DEVICE

(71) Applicant: Huawei Technologies Co., Ltd., Shenzhen (CN)

(72) Inventors: Kexiong Yu, Shenzhen (CN); Liang Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 259 days.

(21) Appl. No.: 18/306,525

(22) Filed: Apr. 25, 2023

(65) Prior Publication Data

US 2023/0318916 A1    Oct. 5, 2023

Related U.S. Application Data

(63) Continuation of application No. PCT/CN2020/124104, filed on Oct. 27, 2020.

(51) Int. Cl.
| | |
|---|---|
| *H04L 41/0806* | (2022.01) |
| *H04L 9/06* | (2006.01) |
| *H04L 9/32* | (2006.01) |
| *H04W 8/00* | (2009.01) |
| *H04W 12/037* | (2021.01) |

(52) U.S. Cl.
CPC ........ *H04L 41/0806* (2013.01); *H04L 9/0618* (2013.01); *H04L 9/3226* (2013.01); *H04W 8/005* (2013.01); *H04W 12/037* (2021.01)

(58) Field of Classification Search
CPC ........ H04W 8/005; H04W 4/80; H04L 63/08; H04L 63/083; H04L 63/0853; H04L 63/0876; G06F 21/305
See application file for complete search history.

(56) References Cited

U.S. PATENT DOCUMENTS 10,129,499 B1 * 11/2018 Boone ................. H04W 12/047
10,897,691 B1 *  1/2021 Hutz ....................... H04W 4/50
(Continued)

FOREIGN PATENT DOCUMENTS

| CN | 110324790 A | 10/2019 |
|---|---|---|
| CN | 110519131 A | 11/2019 |

(Continued)

*Primary Examiner* — Eric W Shepperd
(74) *Attorney, Agent, or Firm* — Slater Matsil, LLP

(57) ABSTRACT

Embodiments of this application disclose a network configuration method and apparatus for an intelligent device. A terminal broadcasts a first discovery packet to the intelligent device. After the intelligent device receives the first discovery packet, the intelligent device broadcasts a first response packet in a short-distance transmission mode. In the short-distance transmission mode, a sending distance of the first response packet does not exceed a first safe distance. The terminal obtains information related to the intelligent device based on the first response packet, performs validity authentication on the intelligent device, and broadcasts an SSID and a password that are of a router and that are encrypted to the intelligent device after the terminal verifies that the intelligent device is valid. The intelligent device accesses the router based on the SSID and the password that are of the router and that are obtained through decryption.

18 Claims, 10 Drawing Sheets

(56) References Cited

U.S. PATENT DOCUMENTS

| | | | |
|---|---|---|---|
| 11,490,259 B2* | 11/2022 | Banwaitt | H04W 4/023 |
| 11,558,187 B2* | 1/2023 | Kumar | H04L 67/12 |
| 2003/0212802 A1* | 11/2003 | Rector | H04W 12/04 |
| | | | 709/228 |
| 2006/0155836 A1* | 7/2006 | Chang | H04L 41/0806 |
| | | | 709/223 |
| 2013/0024685 A1* | 1/2013 | Kolavennu | H04L 41/0806 |
| | | | 713/153 |
| 2014/0082205 A1* | 3/2014 | Abraham | H04L 65/1069 |
| | | | 709/227 |
| 2014/0287690 A1* | 9/2014 | Kim | H04W 4/80 |
| | | | 455/41.3 |
| 2015/0277819 A1* | 10/2015 | Izaki | G06F 3/1226 |
| | | | 358/1.15 |
| 2016/0261769 A1* | 9/2016 | Yamada | H04W 76/14 |
| 2018/0199265 A1* | 7/2018 | Liu | H04W 48/16 |
| 2018/0270883 A1* | 9/2018 | Wu | H04W 76/14 |
| 2019/0182663 A1* | 6/2019 | Wang | H04W 48/14 |
| 2021/0136545 A1* | 5/2021 | Hutz | H04W 4/50 |
| 2021/0152421 A1* | 5/2021 | Wang | H04L 63/083 |
| 2022/0159471 A1* | 5/2022 | Li | H04W 12/63 |

FOREIGN PATENT DOCUMENTS

| | | |
|---|---|---|
| CN | 110601870 A | 12/2019 |
| WO | 2018120624 A1 | 7/2018 |

* cited by examiner

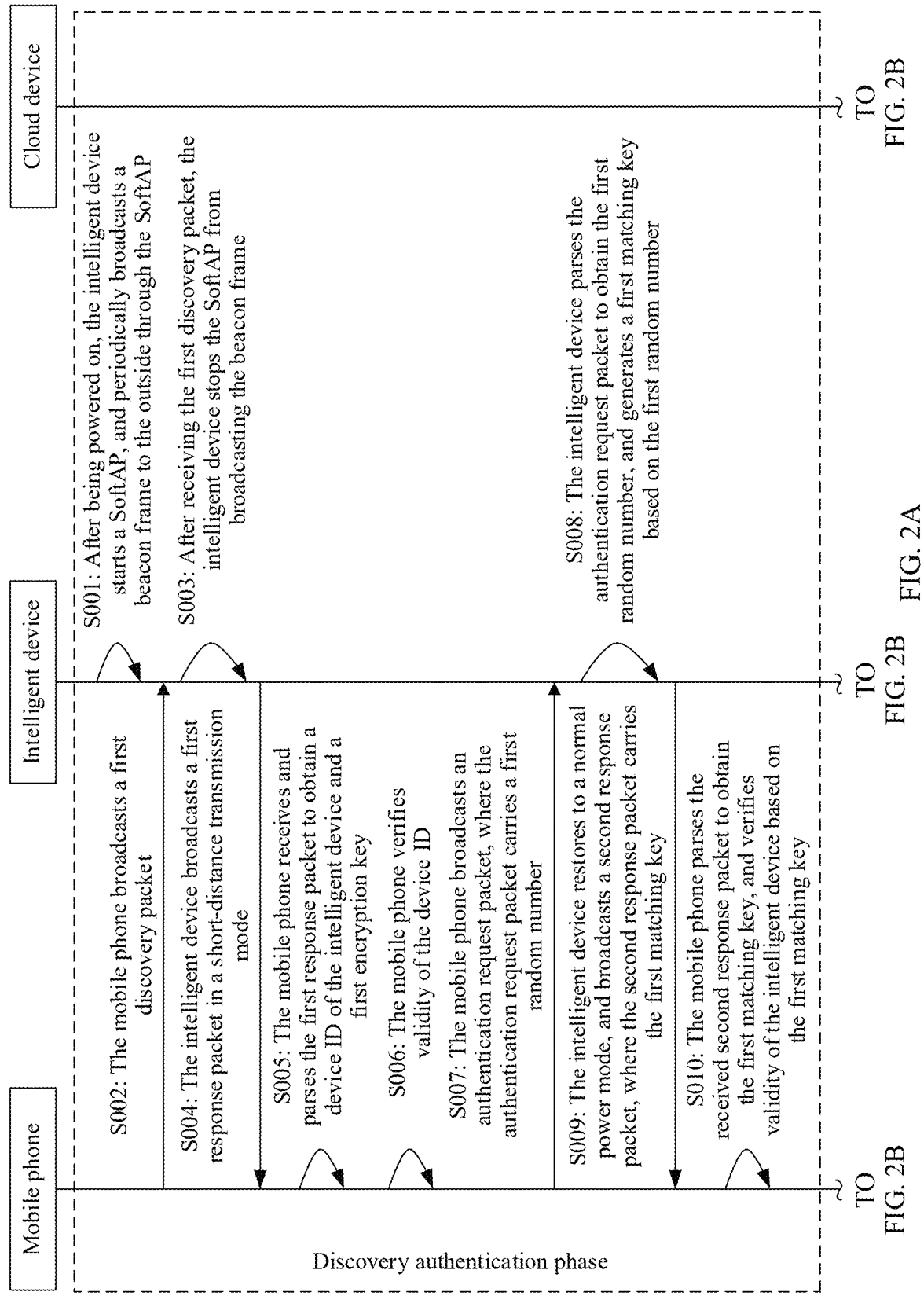

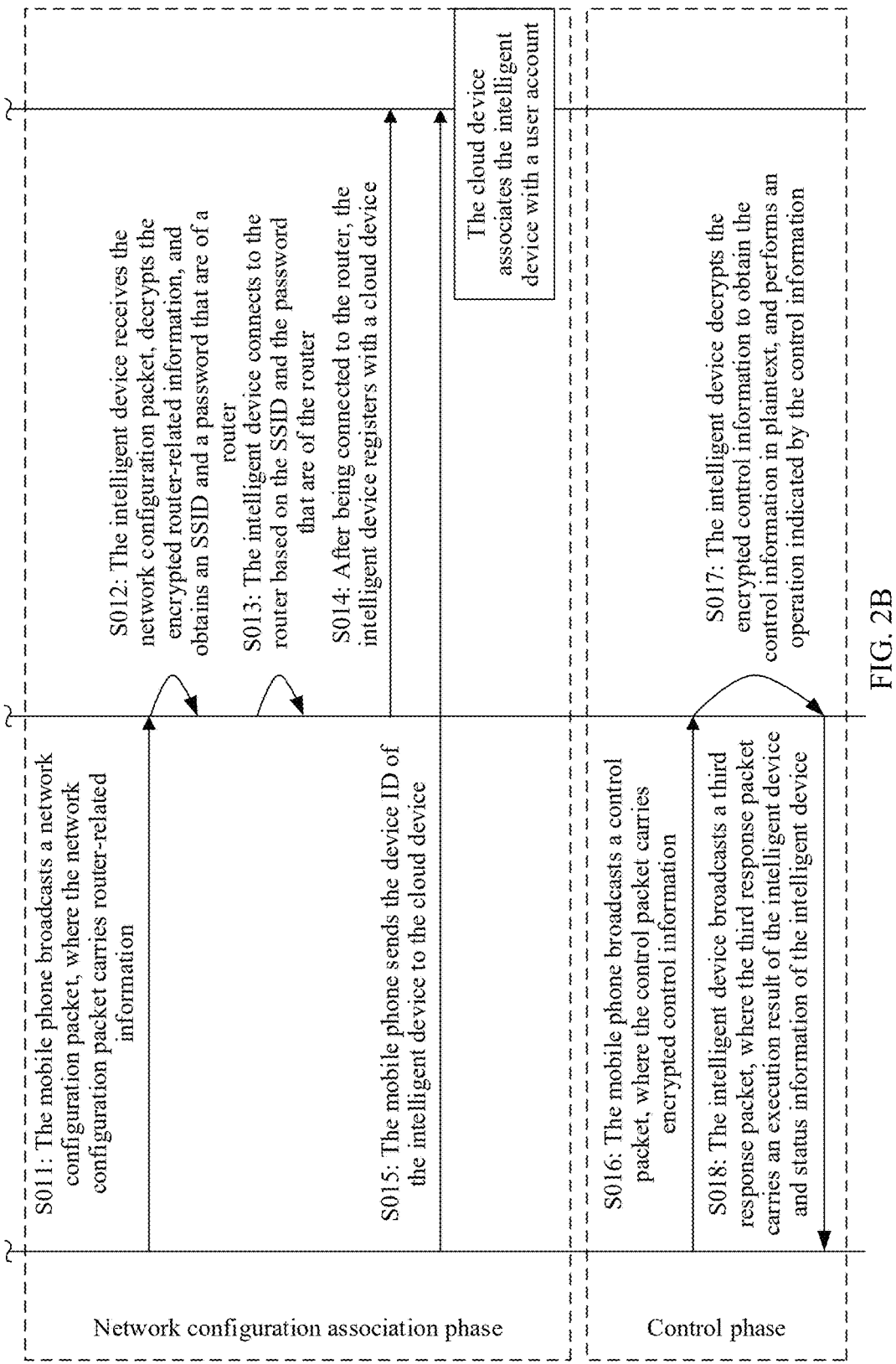

NETWORK CONFIGURATION METHOD AND APPARATUS FOR INTELLIGENT DEVICE

CROSS-REFERENCE TO RELATED APPLICATIONS

This application is a continuation of International Application No. PCT/CN2020/124104, filed on Oct. 27, 2020, the disclosure of which is hereby incorporated by reference in its entirety.

TECHNICAL FIELD

This application relates to the field of communication technologies, and in particular, to a network configuration method and apparatus for an intelligent device.

BACKGROUND

In recent years, the internet of things (IoT) industry is quite popular, especially various powerful and increasingly convenient smart households present great market potential. However, most of the current smart households show off their technologies, and fail to consider from users' needs. Therefore, it is difficult to really resonate with consumers. Currently, most devices in the smart households implement connection through wireless fidelity (Wi-Fi) or Bluetooth. A key pain point of the smart households is network configuration when the smart households are used for the first time. Specifically, a network configuration speed is slow, steps are complex, and a success rate of network configuration is low. The industry urgently needs a network configuration solution that has wide adaptability, high security, fast speed, high success rate, and low costs, to provide better intelligent experience to users.

SUMMARY

Embodiments of this application provide a network configuration method and apparatus for an intelligent device, to simplify a network configuration process. Therefore, time required for network configuration is shortened, providing better intelligent user experience.

A first aspect of this application provides a network configuration method for an intelligent device, where the method includes: receiving a first discovery packet broadcast by a first terminal; broadcasting a first response packet in response to the first discovery packet, where the first response packet carries a device identifier ID of an intelligent device, and the device ID is used by the first terminal to verify validity of the intelligent device; receiving a network configuration packet broadcast by the first terminal, where the network configuration packet carries encrypted router-related information, and the router-related information includes a service set identifier SSID and a password that are of a router; decrypting the encrypted router-related information to obtain the SSID and the password that are of the router; and accessing the router based on the SSID and the password that are of the router.

In this embodiment of this application, network configuration means configuring a network, the intelligent device may be an internet of things device, and the first terminal may be a mobile terminal such as a mobile phone, a tablet computer, or a wearable device. This embodiment of this application provides a simplified network configuration procedure. The intelligent device and the first terminal discover existence of each other by broadcasting the first discovery packet and the first response packet. Further, the network configuration packet exchanged between the intelligent terminal and the first terminal in a network configuration process is also encrypted and broadcast. Therefore, in the entire network configuration process, the first terminal does not need to access a SoftAP of the intelligent device, and does not need to establish point-to-point secure communication with the intelligent device. This greatly simplifies the network configuration process and shortens time required for network configuration.

In a possible implementation, the broadcasting a first response packet in response to the first discovery packet specifically includes: broadcasting, in response to the first discovery packet, the first response packet in a short-distance transmission mode, where in the short-distance transmission mode, a sending distance of the first response packet does not exceed a first safe distance.

After receiving the first discovery packet sent by the terminal, the intelligent device broadcasts the first response packet in the short-distance transmission mode. Theoretically, the broadcast first response packet can be received by any mobile terminal, and to ensure security of the first response packet, a distance for broadcasting the first response packet in the short-distance transmission mode does not exceed the first safe distance. If a terminal that broadcasts the discovery packet is located outside a range of the first safe distance, the terminal cannot receive the first response packet of the intelligent device. In this way, a mobile terminal (for example, a mobile phone outside a user's house) that is outside the range of the first safe distance can be effectively prevented from receiving the first response packet of the intelligent device. Therefore, security of network configuration is improved.

In a possible implementation, the first safe distance is 0.3 meters (m).

In a possible implementation, the first discovery packet may include a session identifier (Session ID), and related packets in a subsequent entire process of network configuration between the mobile phone and the intelligent device carry a same session ID, to indicate that the related packets all belong to a same session.

In a possible implementation, in the short-distance transmission mode, the intelligent device broadcasts the first response packet at first transmit power and a first transmit frequency, where the first transmit power is less than a preset transmit power threshold, and the first transmit frequency is greater than a preset frequency threshold.

Normally, Wi-Fi transmit power is high, and is usually 15 decibel-milliwatts (dBm) to 20 dBm. To ensure that an effective distance for sending the first response packet is short enough to ensure that security-related information is not received by another mobile phone outside the residence of the user, in this embodiment of this application, the transmit power is reduced, so that the distance for sending the first response packet does not exceed the first safe distance. For example, when the first transmit power is less than −65 dBm, the effective distance for sending the first response packet is less than 0.3 m. However, reducing the transmit power causes an increase in a bit error rate and a packet loss rate at a receive end, and reduces a receiving success rate. In this embodiment of this application, a packet receiving success rate is improved by increasing a transmit frequency for sending the first response packet. For example, the first transmit frequency may be 200 times per second.

In a possible implementation, a service layer of the intelligent device sets the first transmit frequency by invoking an application programming interface (application programming interface, API).

In a possible implementation, in the short-distance transmission mode, receiver sensitivity of the intelligent device is reduced, and a clear channel assessment (CCA) threshold of the intelligent device is increased.

A sending success rate depends on the CCA threshold and the receiver sensitivity. Higher receiver sensitivity indicates a stronger capability of the device to detect surrounding interference, and a lower CCA threshold indicates a shorter transmit time window. Reducing the receiver sensitivity of the intelligent device can reduce the capability of the intelligent device to detect surrounding interference, shield interference of remote information to the intelligent device, and improve a capability of sending a signal. Increasing the CCA threshold can increase the transmit time window, decrease a receive time window, and improve the capability of sending the signal. In this embodiment of this application, the packet receiving success rate is further improved by reducing the receiver sensitivity and increasing the CCA threshold.

In a possible implementation, in the short-distance transmission mode, a value of a radio frequency RF register is set, to reduce the receiver sensitivity of the intelligent device, and a value of a baseband register is set, to increase the CCA threshold of the intelligent device.

In a possible implementation, the receiver sensitivity is set to −70 dBm, and the CCA threshold is set to −10 dBm.

In a possible implementation, the first response packet carries the device ID of the intelligent device and a first encryption key that are in plaintext, and the first encryption key is used by the first terminal to encrypt the router-related information carried in the network configuration packet; and the decrypting the encrypted router-related information to obtain the SSID and the password that are of the router specifically includes: decrypting the encrypted router-related information based on the first encryption key, to obtain the SSID and the password that are of the router.

In this embodiment of this application, in the short-distance transmission mode, the device ID of the intelligent device and the first encryption key that are carried in the first response packet are in plaintext. Because plaintext information may be broadcast only within the first safe distance, only the first terminal located within the range of the first safe distance from the intelligent device may receive the plaintext information. This ensures security of the plaintext information. After the first terminal obtains the plaintext information, the first terminal may encrypt, based on the first encryption key, network configuration-related information and control information that are to be sent to the intelligent device, and then broadcasts the encrypted information. Because only the intelligent device and the first terminal located within the range of the first safe distance from the intelligent device have the first encryption key, it is ensured that information broadcast in a network configuration process cannot be decrypted by another device. Therefore, that the plaintext information is broadcast within the first safe distance provides a secure basis for a simplified network configuration procedure.

In a possible implementation, the encrypted router-related information is obtained by encrypting based on a pre-negotiated first encryption key; and the decrypting the encrypted router-related information to obtain the SSID and the password that are of the router specifically includes: decrypting the encrypted router-related information based on the pre-negotiated first encryption key, to obtain the SSID and the password that are of the router.

In a possible implementation, the method further includes: before the first discovery packet is received, periodically broadcasting a beacon (beacon) frame by using a soft access point SoftAP, where the beacon frame includes capability-related information of the intelligent device; and after the first discovery packet is received, stopping the SoftAP from broadcasting the beacon message, and entering the short-distance transmission mode.

In this embodiment of this application, after being powered on, the intelligent device has both a SoftAP network configuration capability and a short-distance network configuration capability. It should be understood that, the intelligent device having the SoftAP network configuration capability means that the intelligent device can periodically send the beacon frame, so that the mobile phone can discover the intelligent device through scanning, and perform network configuration on the intelligent device based on an existing SoftAP network configuration process, and the intelligent device having the short-distance network configuration capability means that the intelligent device can switch to the short-distance transmission mode after receiving the first discovery packet of a mobile terminal such as a mobile phone. In this way, the intelligent device provided in this embodiment of this application is compatible with an existing SoftAP network configuration mode while supporting a new short-distance network configuration mode. If a mobile phone does not support the short-distance network configuration mode, the mobile phone may use the SoftAP network configuration mode. Therefore, the intelligent device provided in this embodiment of this application not only supports network configuration experience of a new mobile phone, but also covers the existing solution, and improves compatibility between old and new mobile phones.

In a possible implementation, a time interval at which the beacon frame is broadcast is 100 ms, and the beacon frame is sent on a specified channel. In a possible implementation, after the router is connected, the method further includes: The intelligent device sends registration information to a cloud device, where the registration information includes the device ID.

In a possible implementation, the registration information further includes a media access control (MAC) address.

In a possible implementation, before the receiving a network configuration packet broadcast by the first terminal, the method further includes: receiving an authentication request packet of the first terminal, where the authentication request packet carries a first random number; and broadcasting a second response packet, where the second response packet carries a first matching key, the first matching key is generated based on the first random number, and the first matching key is used by the first terminal to verify validity of the intelligent device.

In this embodiment of this application, if a terminal detects that an intelligent device is an unauthorized device, for example, a device ID of the intelligent device is not in a whitelist of the terminal, or a matching key exchanged between the intelligent device and the terminal is inconsistent, the terminal stops further interaction with the intelligent terminal. This avoids a mismatch, and improves accuracy and security of network configuration.

In a possible implementation, the intelligent device returns to a normal power mode and sends the second response packet to the first terminal, where transmit power in the normal power mode is greater than the first transmit power.

In a possible implementation, the first matching key is generated by using pre-shared key (PSK) authentication.

In a possible implementation, the intelligent device pre-stores a one-to-one correspondence between a PSK_ID and a PSK, where each PSK_ID is corresponding to one PSK; the intelligent device obtains a PSK corresponding to a first random number S; and the intelligent device performs hash-based message authentication code (HMAC) secure hash algorithm (SHA) 256 (HMAC_SHA256) calculation on the first random number S by using the PSK, to obtain a first matching key S_SHA.

In a possible implementation, the authentication request packet includes a packet header field, a packet type field, a session identifier field, a random number type field, a random number length field, and a random value field.

In a possible implementation, the second response packet includes a packet header field, a packet type field, a session identifier field, a PSK index type field, a PSK index length field, a PSK index value field, a matching key type field, a matching key length field, and a matching key value field.

In a possible implementation, the first response packet includes a packet header field, a packet type field, a session identifier field, a device ID type field, a device ID value field, an encryption key type field, and an encryption key value field. The packet type field indicates a type of the first response packet, and a session identifier in the session identifier field is consistent with a session identifier carried in the first discovery packet.

It should be understood that the device ID of the intelligent device mentioned above is carried in the device ID value field.

In a possible implementation, before the receiving a network configuration packet broadcast by the first terminal, the method further includes: receiving a control packet broadcast by the first terminal, where the control packet carries encrypted control information; decrypting the encrypted control information to obtain the control information in plaintext; performing an operation indicated by the control information in plaintext; and broadcasting a third response packet, where the third response packet carries at least one of an execution result of the intelligent device or status information of the intelligent device.

In this embodiment of this application, before the intelligent device completes network configuration, a terminal may send the control information to the intelligent device without waiting until the intelligent device completes network configuration, completes registration with the cloud, and associates with the user account. In this way, after the terminal discovers and verifies that the intelligent device is valid, the terminal can control the intelligent device. This saves waiting time for the intelligent device to connect to a network, register, and associate with a user account, and improves user experience.

In a possible implementation, after validity authentication on the intelligent device succeeds, the method further includes: The intelligent device receives a control packet sent by the first terminal, where the control packet carries encrypted control information, and the encrypted control information is obtained by encrypting based on the first encryption key; the intelligent device decrypts the encrypted control information based on the first encryption key, to obtain the control information in plaintext; the intelligent device performs an operation indicated by the control information in plaintext; and the intelligent device sends a third response packet to the first terminal, where the third response packet carries at least one of an execution result of the intelligent device or status information of the intelligent device.

In this embodiment of this application, after verifying that the intelligent device is valid, the terminal may send the control information to the intelligent device without waiting until the intelligent device completes registration with the cloud and associates with the user account. In this way, after the terminal discovers and verifies that the intelligent device is valid, the terminal can control the intelligent device. This saves waiting time for the intelligent device to connect to a network, register, and associate with the user account, and improves user experience.

In a possible implementation, the method further includes: feeding back a result of association with the router to the first terminal; and feeding back a result of registering with the cloud device to the first terminal and a result of association with the user account.

A second aspect of this application provides a network configuration method for an intelligent device, where the method includes: broadcasting a first discovery packet; receiving a first response packet broadcast by a first intelligent device, where the first intelligent device is an intelligent device that receives the first discovery packet, and the first response packet carries a device identifier ID of the first intelligent device; performing validity authentication on the first intelligent device based on the device ID; and broadcasting a network configuration packet, where the network configuration packet carries encrypted router-related information, and the router-related information includes a service set identifier SSID and a password that are of a router, where the SSID and the password that are of the router are used by the first intelligent device to access the router.

In this embodiment of this application, the method may be performed by a mobile terminal such as a mobile phone, a tablet computer, or a wearable device, and the intelligent device may be an internet of things device. This embodiment of this application provides a simplified network configuration procedure. The intelligent device and the first terminal discover existence of each other by broadcasting the first discovery packet and the first response packet. Further, the network configuration packet exchanged between the intelligent terminal and the first terminal in a network configuration process is also encrypted and broadcast. Therefore, in the entire network configuration process, the first terminal does not need to access a SoftAP of the intelligent device, and does not need to establish point-to-point secure communication with the intelligent device. This greatly simplifies the network configuration process and shortens time required for network configuration.

In a possible implementation, after it is determined that the device ID of the first intelligent device is valid, and before the broadcasting a network configuration packet, the method further includes: broadcasting an authentication request packet, where the authentication request packet carries a first random number; receiving a second response packet broadcast by the first intelligent device, where the second response packet carries a first matching key, and the first matching key is generated based on the first random number; generating a second matching password based on the first random number; and when the first matching key is equal to the second matching key, determining that the first intelligent device is valid.

In this embodiment of this application, if a terminal detects that an intelligent device is an unauthorized device, for example, a device ID of the intelligent device is not in a whitelist of the terminal, or a matching key exchanged between the intelligent device and the terminal is inconsistent, the terminal stops further interaction with the intelligent terminal. This avoids a mismatch, and improves accuracy and security of network configuration.

In a possible implementation, after it is determined that the first intelligent device is valid, the method further includes: broadcasting a control packet, where the control packet carries encrypted control information; and receiving a third response packet of the first intelligent device, where the third response packet carries at least one of an execution result of the first intelligent device or status information of the first intelligent device.

In this embodiment of this application, after verifying that the intelligent device is valid, the terminal may send the control information to the intelligent device without waiting until the intelligent device completes registration with a cloud and associates with a user account. In this way, after the terminal discovers and verifies that the intelligent device is valid, the terminal can control the intelligent device. This saves waiting time for the intelligent device to connect to a network, register, and associate with the user account, and improves user experience.

In a possible implementation, the receiving a first response packet broadcast by a first intelligent device specifically includes: receiving the first response packet within a range of a first safe distance from the first intelligent device, where the first response packet carries the device ID of the first intelligent device and a first encryption key that are in plaintext, and the first encryption key is a key used to encrypt the router-related information and the control information. It should be understood that, if a distance from the first intelligent device exceeds the first safe distance, the first response packet cannot be received. Therefore, a terminal whose distance from the first intelligent device exceeds the first safe distance cannot obtain the device ID and the first encryption key that are in plaintext.

In a possible implementation, the method further includes: sending the device ID obtained based on the first response packet to a cloud device.

In this method embodiment, the terminal does not need to obtain the device ID in a form of scanning a quick response (QR) code. This further simplifies a process of performing initial network configuration on the intelligent device.

In a possible implementation, the method further includes: receiving an association result fed back by the intelligent device; and sending a control packet to the intelligent device after the intelligent device is successfully associated with the user account.

In this embodiment of this application, after the intelligent device successfully registers with the cloud and is successfully associated with the user account, the intelligent device sends the control information to the intelligent device. This is compatible with the conventional technology.

In a possible implementation, the encrypted router-related information is carried in a network configuration packet, where the network configuration packet includes a packet header field, a packet type field, a session identifier field, an association type field, an association mode field, a channel ID field, a router SSID length field, a router SSID value field, a router password length field, and a router password value field. An association type indicates a type of an association-related variable, and the association-related variable includes an association mode, a channel ID, and the SSID and the password that are of the router.

In a possible implementation, the authentication request packet includes a packet header field, a packet type field, a session identifier field, a random number type field, a random number length field, and a random value field.

A third aspect of this application provides a network configuration method. The method includes: An intelligent device receives a first discovery packet broadcast by a first terminal; and the intelligent device broadcasts, in response to the first discovery packet, a first response packet in a short-distance transmission mode, where the first response packet carries a device identifier ID of the intelligent device and a first encryption key that are in plaintext; in the short-distance transmission mode, a sending distance of the first response packet does not exceed a first safe distance; and the first encryption key is used by the first terminal to encrypt information to be sent to the intelligent device, where the information to be sent to the intelligent device includes network configuration-related information.

In this embodiment of this application, after receiving the first discovery packet broadcast by the first terminal, the intelligent device broadcasts the device identifier and the first encryption key that are in plaintext within the first safe distance. Because the device identifier and the first encryption key are in plaintext, to ensure security of the plaintext information, a distance for sending the first response packet needs to be short enough (does not exceed the first safe distance), so that the plaintext information is not received by another mobile phone outside a residence of a user. In this way, security of the plaintext information is ensured. Further, after receiving the device identifier and the first encryption key that are in plaintext, the first terminal may broadcast to-be-sent information (for example, information required for network configuration association and control information) after the to-be-sent information is encrypted based on the first encryption key. In this way, because only the intelligent device and the first terminal located within a range of the first safe distance from the intelligent device have the first encryption key, it is ensured that information broadcast in a network configuration process cannot be decrypted by another device. This ensures security of network configuration while simplifying the network configuration process.

In a possible implementation, in the short-distance transmission mode, the intelligent device broadcasts the first response packet at first transmit power and a first transmit frequency, where the first transmit power is less than a preset transmit power threshold, and the first transmit frequency is greater than a preset frequency threshold.

In a possible implementation, in the short-distance transmission mode, receiver sensitivity of the intelligent device is reduced, and a clear channel assessment CCA threshold of the intelligent device is increased.

In a possible implementation, the method further includes: before the first discovery packet is received, periodically broadcasting a beacon frame by using a soft access point SoftAP, where the beacon frame includes capability-related information of the intelligent device; and after the first discovery packet is received, stopping the SoftAP from broadcasting the beacon frame, and entering the short-distance transmission mode.

In a possible implementation, after the broadcasting a first response packet in a short-distance transmission mode, the method further includes: receiving a network configuration packet broadcast by the first terminal, where the network configuration packet carries the network configuration-related information encrypted based on the first encryption key, and the network configuration-related information includes a service set identifier SSID and a password that are of a router, decrypting the encrypted network configuration-related information based on the first encryption key, to obtain the SSID and the password that are of the router; and accessing the router based on the SSID and the password that are of the router.

In this embodiment of this application, the intelligent device and the first terminal have a same first encryption key, and the first encryption key cannot be obtained by another terminal located outside the range of the first safe distance. Therefore, the network configuration-related information may be broadcast after being encrypted based on the first encryption key, the first terminal does not need to access the SoftAP of the intelligent device, and does not need to establish point-to-point secure communication with the intelligent device. This greatly simplifies the network configuration process.

In a possible implementation, before the receiving a network configuration packet broadcast by the first terminal, the method further includes: receiving an authentication request packet broadcast by the first terminal, where the authentication request packet includes a first random number; generating a first matching key based on the first random number; and broadcasting a second response packet, where the second response packet includes the first matching key, and the first matching key is used by the first terminal to verify validity of the intelligent device.

In this embodiment of this application, if a terminal detects that an intelligent device is an unauthorized device, for example, a device ID of the intelligent device is not in a whitelist of the terminal, or a matching key exchanged between the intelligent device and the terminal is inconsistent, the terminal stops further interaction with the intelligent terminal. This avoids a mismatch, and improves accuracy and security of network configuration.

In a possible implementation, the information to be sent to the intelligent device further includes control information, and after validity authentication on the intelligent device succeeds, and before the accessing the router based on the SSID and the password that are of the router, the method further includes: receiving a control packet broadcast by the first terminal, where the control packet carries the control information encrypted based on the first encryption key; decrypting the encrypted control information based on the first encryption key, to obtain the control information in plaintext; performing an operation indicated by the control information in plaintext; and broadcasting a third response packet, where the third response packet carries at least one of an execution result of the intelligent device or status information of the intelligent device.

In this embodiment of this application, after validity authentication on the intelligent device is completed and before the intelligent device completes network configuration, the terminal may send the control information to the intelligent device without waiting until the intelligent device completes network configuration, completes registration with the cloud, and associates with the user account. This saves waiting time for the intelligent device to connect to a network, register, and associate with the user account, and improves user experience.

A fourth aspect of this application provides a network configuration apparatus. The apparatus includes: a receiving unit, configured to receive a first discovery packet broadcast by a first terminal; and a sending unit, configured to broadcast a first response packet in response to the first discovery packet, where the first response packet carries a device identifier ID of an intelligent device, and the device ID is used by the first terminal to verify validity of the intelligent device. The receiving unit is further configured to receive a network configuration packet broadcast by the first terminal, where the network configuration packet carries encrypted router-related information, and the router-related information includes a service set identifier SSID and a password that are of a router. The apparatus further includes a decryption unit, configured to decrypt the encrypted router-related information to obtain the SSID and the password that are of the router; and a communication unit, configured to access the router based on the SSID and the password that are of the router.

It should be understood that for beneficial effects on an apparatus side of the fourth aspect, refer to beneficial effects on a method side of the first aspect. Details are not described herein again in this embodiment of this application. The network configuration apparatus in the fourth aspect may be, for example, a processor or a chip on an intelligent device side. The foregoing functional units may be hardware units, or may be software units implemented by running a program by a processor or a chip. The intelligent device completes network configuration-related steps by using the processor or the chip.

In a possible implementation, the sending unit is specifically configured to: in response to the first discovery packet, broadcast the first response packet in a short-distance transmission mode, where in the short-distance transmission mode, a sending distance of the first response packet does not exceed a first safe distance.

In a possible implementation, the sending unit is specifically configured to: in the short-distance transmission mode, broadcast the first response packet at first transmit power and a first transmit frequency, where the first transmit power is less than a preset transmit power threshold, and the first transmit frequency is greater than a preset frequency threshold.

In a possible implementation, in the short-distance transmission mode, receiver sensitivity of the apparatus is reduced, and a clear channel assessment CCA threshold of the apparatus is increased.

In a possible implementation, the first response packet carries the device ID of the intelligent device and a first encryption key that are in plaintext, and the first encryption key is used by the first terminal to encrypt the router-related information carried in the network configuration packet. The decryption unit is specifically configured to decrypt the encrypted router-related information based on the first encryption key, to obtain the SSID and the password that are of the router.

In a possible implementation, the apparatus further includes a soft access point SoftAP. Before the first discovery packet is received, a beacon (beacon) frame is periodically broadcast through the SoftAP, where the beacon frame includes capability-related information of the apparatus, and after the first discovery packet is received, the SoftAP is stopped from broadcasting the beacon message, and the short-distance transmission mode is entered.

In a possible implementation, before receiving the network configuration packet broadcast by the first terminal, the receiving unit is further configured to receive an authentication request packet sent by the first terminal, where the authentication request packet includes a first random number; the apparatus further includes a security authentication unit, configured to generate a first matching key based on the first random number; and the sending unit is further configured to broadcast a second response packet, where the second response packet includes the first matching key, and the first matching key is used by the first terminal to verify validity of the apparatus.

In a possible implementation, before receiving the network configuration packet broadcast by the first terminal, the receiving unit is further configured to receive a control packet sent by the first terminal, where the control packet carries encrypted control information; the decryption unit is further configured to decrypt the encrypted control information to obtain the control information in plaintext; the apparatus further includes an execution unit, configured to perform an operation indicated by the control information in plaintext; and the sending unit is further configured to broadcast a third response packet, where the third response packet carries at least one of an execution result of the apparatus or status information of the apparatus.

A fifth aspect of this application provides a network configuration apparatus. The apparatus includes: a sending unit, configured to broadcast a first discovery packet; a receiving unit, configured to receive a first response packet broadcast by a first intelligent device, where the first intelligent device is an intelligent device that receives the first discovery packet, and the first response packet carries a device identifier ID of the first intelligent device; and a security authentication unit, configured to perform validity authentication on the first intelligent device based on the device ID. The sending unit is further configured to broadcast a network configuration packet, where the network configuration packet carries encrypted router-related information, and the router-related information includes a service set identifier SSID and a password that are of a router, where the SSID and the password that are of the router are used by the first intelligent device to access the router.

It should be understood that for beneficial effects on an apparatus side of the fifth aspect, refer to beneficial effects on a method side of the second aspect. Details are not described herein again in this embodiment of this application. The network configuration apparatus in the fifth aspect may be, for example, a processor or a chip on a mobile terminal side. The foregoing functional units may be hardware units, or may be software units implemented by running a program by a processor or a chip. The mobile terminal completes network configuration-related steps by using the processor or the chip.

In a possible implementation, after it is determined that the device ID of the first intelligent device is valid, and before broadcasting the network configuration packet, the sending unit is further configured to: broadcast an authentication request packet, where the authentication request packet carries a first random number; the receiving unit is further configured to receive a second response packet broadcast by the first intelligent device, where the second response packet carries a first matching key, and the first matching key is generated based on the first random number; and the security authentication unit is further configured to: generate a second matching password based on the first random number, and when the first matching key is equal to the second matching key, determine that the first intelligent device is valid.

In a possible implementation, after the first intelligent device is verified to be valid, the sending unit is further configured to broadcast a control packet to the first intelligent device, where the control packet carries encrypted control information; and the receiving unit is further configured to receive a third response packet of the first intelligent device, where the third response packet carries at least one of an execution result of the first intelligent device or status information of the first intelligent device.

In a possible implementation, the receiving unit is further configured to receive an association result fed back by the first intelligent device. After the first intelligent device is successfully associated with a user account, the sending unit is further configured to send a control packet to the first intelligent device.

In a possible implementation, the receiving unit is specifically configured to receive the first response packet within a range of a first safe distance from the first intelligent device, where the first response packet carries the device ID of the first intelligent device and a first encryption key that are in plaintext; and the apparatus further includes an encryption unit, configured to: encrypt the router-related information based on the first encryption key; and encrypt the control information based on the first encryption key.

A sixth aspect of this application provides a network configuration apparatus. The apparatus includes: a receiving unit, configured to receive a first discovery packet broadcast by a first terminal; and a sending unit, configured to broadcast, in response to the first discovery packet, a first response packet in a short-distance transmission mode, where the first response packet carries a device identifier ID of an intelligent device and a first encryption key that are in plaintext; in the short-distance transmission mode, a sending distance of the first response packet does not exceed a first safe distance; and the first encryption key is used by the first terminal to encrypt information to be sent to the intelligent device, where the information to be sent to the intelligent device includes network configuration-related information.

It should be understood that for beneficial effects on an apparatus side of the sixth aspect, refer to beneficial effects on a method side of the third aspect. Details are not described herein again in this embodiment of this application. The network configuration apparatus in the sixth aspect may be, for example, a processor or a chip on an intelligent device side. The foregoing functional units may be hardware units, or may be software units implemented by running a program by a processor or a chip. The intelligent device completes network configuration-related steps by using the processor or the chip.

In a possible implementation, in the short-distance transmission mode, the sending unit is specifically configured to broadcast the first response packet at first transmit power and a first transmit frequency, where the first transmit power is less than a preset transmit power threshold, and the first transmit frequency is greater than a preset frequency threshold.

In a possible implementation, in the short-distance transmission mode, receiver sensitivity of the intelligent device is reduced, and a clear channel assessment CCA threshold of the intelligent device is increased.

In a possible implementation, the apparatus further includes a soft access point SoftAP, configured to: before the first discovery packet is received, periodically broadcast a beacon frame through the SoftAP, where the beacon frame includes capability-related information of the intelligent device; and after the first discovery packet is received, stop the SoftAP from broadcasting the beacon frame, and enter the short-distance transmission mode.

In a possible implementation, after the first response packet is broadcast in the short-distance transmission mode, the receiving unit is further configured to receive a network configuration packet broadcast by the first terminal, where the network configuration packet carries the network configuration-related information encrypted based on the first encryption key; and the network configuration-related information includes a service set identifier SSID and a password that are of a router. The apparatus further includes a decryption unit, configured to decrypt the encrypted network configuration-related information based on the first encryption key, to obtain the SSID and the password that are of the router. The apparatus further includes a communication unit, configured to access the router based on the SSID and the password that are of the router.

In a possible implementation, before receiving the network configuration packet broadcast by the first terminal, the receiving unit is further configured to receive an authentication request packet broadcast by the first terminal, where the authentication request packet includes a first random number. The apparatus further includes a security authentication unit, configured to generate a first matching key based on the first random number. The sending unit is further configured to broadcast a second response packet, where the second response packet includes the first matching key, and the first matching key is used by the first terminal to verify validity of the intelligent device.

In a possible implementation, the information to be sent to the intelligent device further includes control information, and after validity authentication on the intelligent device succeeds, and before the router is accessed based on the SSID and the password that are of the router, the receiving unit is further configured to: receive a control packet broadcast by the first terminal, where the control packet carries the control information encrypted based on the first encryption key. The decryption unit is further configured to decrypt the encrypted control information based on the first encryption key, to obtain the control information in plaintext. The apparatus further includes an execution unit, configured to perform an operation indicated by the control information in plaintext. The sending unit is further configured to broadcast a third response packet, where the third response packet carries at least one of an execution result of the intelligent device or status information of the intelligent device.

A seventh aspect of this application provides a network configuration apparatus. The apparatus includes a processor and an interface unit, the processor sends/receives data through the interface unit, and the processor is configured to read software instructions stored in a memory, so that the apparatus performs the network configuration method according to any one of the first aspect or the possible implementations of the first aspect.

In a possible implementation, the apparatus further includes the memory.

An eighth aspect of this application provides a network configuration apparatus. The apparatus includes a processor and an interface unit, the processor sends/receives data through the interface unit, and the processor is configured to read software instructions stored in a memory, so that the apparatus performs the network configuration method according to any one of the second aspect or the possible implementations of the second aspect.

A ninth aspect of this application provides a network configuration apparatus. The apparatus includes a processor and an interface unit, the processor sends/receives data through the interface unit, and the processor is configured to read software instructions stored in a memory, so that the apparatus performs the network configuration method according to any one of the third aspect or the possible implementations of the third aspect.

A tenth aspect of this application provides an intelligent device. The intelligent device includes a function module configured to perform the network configuration method according to any one of the first aspect or the possible implementations of the first aspect.

An eleventh aspect of this application provides a terminal. The terminal includes a function module configured to perform the network configuration method according to any one of the second aspect or the possible implementations of the second aspect.

A twelfth aspect of this application provides an intelligent device. The intelligent device includes a function module configured to perform the network configuration method according to any one of the third aspect or the possible implementations of the third aspect.

A thirteenth aspect of this application provides a computer-readable storage medium. The computer-readable storage medium stores instructions, and when the instructions are run on a computer or a processor, the computer or the processor is enabled to perform the method according to any one of the first aspect or the possible implementations of the first aspect, the method according to any one of the second aspect or the possible implementations of the second aspect, or the method according to any one of the third aspect or the possible implementations of the third aspect.

A fourteenth aspect of this application provides a computer program product including instructions. When the instructions are run on a computer or a processor, the computer or the processor is enabled to perform the method according to any one of the first aspect or the possible implementations of the first aspect, the method according to any one of the second aspect or the possible implementations of the second aspect, or the method according to any one of the third aspect or the possible implementations of the third aspect.

BRIEF DESCRIPTION OF THE DRAWINGS

FIG. 2A and FIG. 2B are an interaction flowchart of an example of network configuration for an intelligent device according to an embodiment of this application;

DETAILED DESCRIPTION OF ILLUSTRATIVE EMBODIMENTS

Figure 1:
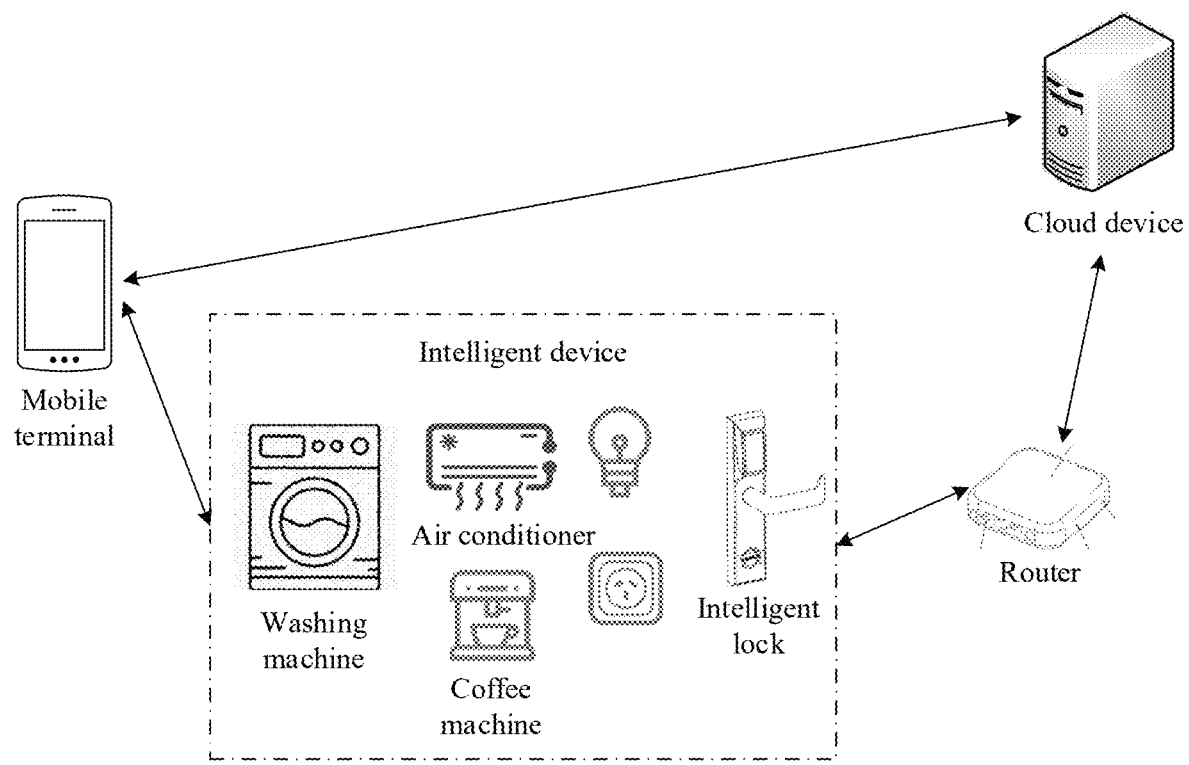
FIG. 1 is a schematic diagram of an example application scenario according to an embodiment of this application.

In the specification, claims, and accompanying drawings of this application, the terms "first", "second", and the like are intended to distinguish between similar objects but do not necessarily indicate a specific order or sequence. In addition, the terms "include", "have", and any variant thereof are intended to cover non-exclusive inclusion, for example, include a series of steps or units. Methods, systems, products, or devices are not necessarily limited to those steps or units that are literally listed, but may include other steps or units that are not literally listed or that are inherent to such processes, methods, products, or devices.

It should be understood that in this application, "at least one (item)" refers to one or more, and "a plurality of" refers to two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one item (piece) of a, b, or c may indicate a, b, c, "a and b", "a and c", "b and c", or "a, b, and c", where a, b, and c may be singular or plural.

First, for ease of understanding embodiments of this application, the following first describes some terms in embodiments of this application.

Software enabled access point (SoftAP): A software enabled access point may also be referred to as a virtual router. The SoftAP integrates a driver, and enables a computer that is not specially designed for a router to become a wireless access point through the driver. The SoftAP is a commonly used to configure Wi-Fi for home appliances, home security cameras, smart household products, or other IoT devices. When accessing a network through the SoftAP, users only need to click "Next" and follow instructions step by step.

Wi-Fi has two working modes: an access point (AP) mode and a station (STA) mode. The AP mode provides a wireless access service, allows access of other wireless devices, and provides data access. APs are allowed to be connected to each other when a wireless router or bridge works in the AP mode. STA mode: A device in the STA mode is similar to a wireless terminal such as a notebook computer, a personal digital assistant (PDA), or a smartphone having a Wi-Fi module, and does not accept access of another wireless device. However, the device in the STA mode may be connected to a Wi-Fi network of another AP or wireless local area network (WLAN) router. A wireless network adapter generally works in the STA mode. For example, a home router receives access of a device such as a mobile phone in the AP mode, and provides an internet access function. However, the home router does not accept access of a device such as a mobile phone in the STA mode.

Service set identifier (SSID): Each wireless AP has an SSID for user identification, that is, a Wi-Fi name.

Dynamic host configuration protocol client (DHCP Client): A DHCP client is generally an independent host in a local area network, and obtains configuration parameters such as an internet protocol (IP) address by using a DHCP. The DHCP is usually used in a local area network environment, and is mainly used to manage and allocate IP addresses in a centralized manner, so that a client dynamically obtains information such as an IP address, a gateway address, and a domain name system (DNS) server address, and address usage can be improved. The DHCP provides the client with enough information to establish an endpoint for network communication, and further provides the client with other parameters required by system-level and application-level software.

Hash-based message authentication code (HMAC): Hash-based message authentication code is message authentication code generated based on a cryptographic hash function and a key, and may be used to ensure data integrity and authenticate a message. An HMAC operation uses a hash algorithm, uses a key and a message (usually a number) as input, and generates a message digest as output.

Secure hash algorithm (SHA): A secure hash algorithm is a secure hash algorithm certified by the Federal Information Processing Standards (FIPS), including a family of cryptographic hash functions, and can calculate a fixed-length character string (also referred to as a message digest) corresponding to a number. In addition, if different numbers are input, it is highly likely to obtain different character strings.

SHA256: SHA256 is a type of secure hash algorithm, and also referred to as a hash function. The hash function can reduce a data amount and use a fixed a data format. The function disorders and mixes data, and creates a new hash value, where the hash value is usually represented by a short random string of letters and numbers. For messages of any length, a 256-bit hash value is generated by using SHA256.

HMAC_SHA256: HMAC_SHA256 is an HMAC algorithm that uses SHA256 to generate a hash value. HMAC_SHA256 is defined as follows:

HMAC_SHA256=SHA256 (k XOR opad||SHA256 (k XOR ipad, m))

SHA256 is an SHA-256 encryption algorithm, and an output hash value length of SHA256 is 256 bits.

|| indicates a combination operation, that is, two character strings are combined.

k is a key (secret key), and is usually a bit sequence.

m is a to-be-authenticated message.

ipad is a bit sequence. For example, ipad is a bit sequence formed by cyclically repeating a 00110110 sequence until a group length is reached, and "i" in "ipad" means inner. A packet length of SHA256 is 512 bits.

opad is a bit sequence. For example, opad is a bit sequence formed by cyclically repeating a bit sequence 01011100 until a packet length is reached, where "o" in "opad" means outer.

XOR is a logical exclusive OR (exclusive OR, XOR) operator. When two values in an exclusive OR operation are the same, a result of XOR is false, and when two values in the exclusive OR operation are different, a result of XOR is true. After an XOR operation is performed, a bit sequence that is the same as a packet length of a one-way hash function and is related to a key is obtained.

Password-based key derivation function 2 (PBKDF2): A password-based key derivation function 2 is a function used to derive a key, and is often used to generate an encrypted password. A basic principle of this function is to use a pseudo-random function, such as an HMAC function, to repeatedly calculate a plaintext password and a salt value as input parameters, and finally generate a key. If the function is repeated for a large quantity of times, costs of cracking the key are very high. The PBKDF2 function may be defined as follows:

DK=PBKDF2 (PRF, Password, Salt, c, dkLen)

PRF is a pseudo-random function, such as the HMAC function. PRF outputs a result whose length is hLen. Password is a plaintext password used to generate a key. Salt is a salt value used for encryption. c is a number of times that calculation is repeated. dkLen is a length of an expected key. DK is a final generated key.

Advanced encryption standard (AES): An advanced encryption standard is a block encryption standard adopted by the U.S. Federal Government, and is one of the most popular algorithms in symmetric key encryption. A block length of the AES is fixed at 128 bits, and a length of a key may be 128, 192, or 256 bits, where a length of a key obtained by using the AES 128 is 128 bits.

Embodiments of this application are mainly applied to a scenario in which an intelligent device is powered on and controlled for a first time. It should be understood that the intelligent device may be a smart household device or a wearable device. Alternatively, the intelligent device may be an intelligent device that may be connected to a network in other scenarios than non-home scenarios such as industrial fields, smart cities, and public scenarios. FIG. 1 is a schematic diagram of an example application scenario according to an embodiment of this application. Devices in the application scenario include a mobile terminal, an intelligent device, a router, and a cloud device. The mobile terminal may be, for example, a mobile phone, a tablet computer, or an iPad. The intelligent device may include smart households such as a washing machine, an air conditioner, a coffee maker, a light bulb, a socket, and an intelligent lock. The router is a router at home. It should be understood that these smart households are IoT devices with a networking function, and may access a network by using the router at home, a hotspot of the mobile phone, and the like. The smart households are usually connected to the network through the router at home. The smart households can communicate with the cloud device after connecting to the network through the router at home. The mobile terminal may communicate with the cloud device by using the network connected to the router, or may communicate with the cloud device by using a mobile data network of the mobile terminal. For example, the mobile terminal may directly send control information to the intelligent device, and accept an operation result returned by the intelligent device. Alternatively, the mobile terminal may send a remote control command to the intelligent device by using the cloud device. After accessing the network of the router, the intelligent device may send registration information to the cloud device, and receive a registration result fed back by the cloud device. Further, the intelligent device may feed back the registration result to the mobile terminal. Generally, a newly added intelligent device usually needs to perform network configuration, connect to a network, register with a cloud, and associate with a user account, and then a user can control the intelligent device by using a mobile terminal such as a mobile phone.

Currently, most smart households in the market use a SoftAP for network configuration. Specifically, a SoftAP network configuration process is as follows:

1: Create a SoftAP on an intelligent device and set an SSID for the SoftAP on the intelligent device.

2: A mobile phone detects the SSID of the SoftAP and connects to the SoftAP through the SSID. After a link layer connection is complete, the mobile phone obtains an IP address through a DHCP client.

3: The mobile phone establishes a secure channel for point-to-point communication with the intelligent device based on the IP address at a transmission control protocol (TCP) layer or an IP layer.

4: A user performs an operation on an application (app) interface of the mobile phone, so that the mobile phone transmits an SSID and a password that are of a WLAN router to the intelligent device through the foregoing established secure channel. It should be understood that the WLAN router is a router at home.

5: After the intelligent device obtains the SSID and the password that are of the router, the intelligent device enables a station mode and connects to the WLAN router by using the obtained SSID and password. It should be understood that enabling the station mode by the intelligent device indicates that the intelligent device has a capability of accessing a Wi-Fi network of another AP or router.

6: After connecting to the router, the intelligent device registers with a cloud.

7: The mobile phone scans QR code on the intelligent device, and sends obtained identification information to a cloud device. When the ID registered by the intelligent device on the cloud is consistent with the identification information obtained by scanning the QR code by the mobile phone, the cloud device associates the intelligent device with a user account.

A conventional SoftAP network configuration process has the following disadvantages: A mobile phone needs to first scan a SoftAP of an intelligent device, establishes a connection with the SoftAP, and obtains an IP address. Then, only after the mobile phone establishes a secure channel with the intelligent device, the mobile phone can send SSID and password information that are of a router to the intelligent device. Steps in this network configuration process are complex, and network configuration takes long time. In addition, because the mobile phone can access only one Wi-Fi network at a time, a communication link between the mobile phone and the router needs to be cut off because the mobile phone needs to connect to the SoftAP of the intelligent device during the network configuration process. As a result, a WLAN network service of the mobile phone is interrupted, and user experience is poor.

FIG. 2A and FIG. 2B are an interaction flowchart of an example of network configuration for an intelligent device according to an embodiment of this application. An example in which a mobile terminal held by a user is a mobile phone is used for description. A network configuration procedure in a short-distance network configuration mode specifically includes the following steps.

S001: After being powered on, the intelligent device starts a SoftAP, and periodically broadcasts a beacon frame to the outside through the SoftAP.

It should be understood that the intelligent device periodically broadcasts the beacon frame to the outside, to notify the outside of a capability of the intelligent device, where the beacon frame includes capability-related information of the intelligent device, for example, an SSID of the SoftAP of the intelligent device, a rate supported by the SoftAP, whether the intelligent device supports polling, vendor information, and the like. An external device such as a mobile phone may discover the intelligent device by using the beacon frame, and connect to the intelligent device through the SoftAP. The SoftAP broadcasts the beacon frame on a specified channel. The mobile phone can scan beacon frames on different channels in sequence. The SoftAP of the intelligent device can be scanned only on the specified channel. In an optional case, the mobile phone and the intelligent device may negotiate a specified channel in advance, and the mobile phone may directly scan the specified channel to discover the SoftAP of the intelligent device. In an example case, a default interval at which the intelligent device periodically broadcasts the beacon frame may be 100 ms.

S002: The mobile phone broadcasts a first discovery packet, where the first discovery packet is used to discover the intelligent device.

In this embodiment of this application, the mobile phone actively broadcasts the first discovery packet used to discover the intelligent device, instead of discovering the intelligent device by scanning the beacon frame sent by the intelligent device. The first discovery packet may be received by any device. For example, the first discovery packet may include a session identifier (Session ID), and related packets in an entire subsequent process of network configuration between the mobile phone and the intelligent device carry a same session ID, to indicate that the related packets all belong to a same session. It should be understood that when performing network configuration on the intelligent device by using the mobile phone, the user needs to start an app. The app may be, for example, a smart home app, a home app, or the like. In an optional case, the mobile phone sends the first discovery packet only after the app is enabled. In another optional case, after the mobile phone is powered on, the mobile phone always periodically sends the first discovery packet in the background. In this case, an interval for broadcasting the first discovery packet is set to be long, to reduce power consumption of the mobile phone.

S003: After receiving the first discovery packet, the intelligent device stops the SoftAP from broadcasting the beacon frame.

S004: The intelligent device broadcasts a first response packet in a short-distance transmission mode.

It should be understood that, after receiving the first discovery packet broadcast by the mobile phone, the intelligent device stops the SoftAP from sending the beacon frame, switches to the short-distance transmission mode, and broadcasts the first response packet in the short-distance transmission mode. The first response packet carries information related to the intelligent device, and the information is in plaintext. Therefore, to ensure security of the information in plaintext, a distance of broadcasting the first response packet in the short-distance transmission mode does not exceed a first safe distance. If a mobile phone that broadcasts the discovery packet is located outside a range of the first safe distance, the mobile phone cannot receive the first response packet of the intelligent device. Therefore, when network configuration is performed on the intelligent device by using the mobile phone, the user needs to enter the range of the first safe distance of the intelligent device with the mobile phone. In other words, a distance between the mobile phone and the intelligent device should not exceed the first safe distance. The first safe distance is a distance specified by the Security Engineering Department, and may be, for example, 0.3 m. Typically, two homes are separated by a wall, and a thickness of the wall that complies with the Security Engineering Department is about 30 cm. Therefore, the first safe distance is set to 0.3 m, to ensure that the first response packet does not penetrate the wall and is received by a next-door household. Only a mobile phone located within the first safe distance can receive the first response packet of the intelligent device. Therefore, this effectively prevents a mobile phone located outside a user's house from receiving the first response packet of the intelligent device, so that security of network configuration is improved. In an optional case, the intelligent device broadcasts the first response packet at intervals of about one second in the short-distance transmission mode, and stops broadcasting the first response packet after one second.

In this embodiment of this application, after being powered on, the intelligent device has both a SoftAP network configuration capability and a short-distance network configuration capability. It should be understood that, the intelligent device having the SoftAP network configuration capability means that the intelligent device can perform network configuration by using an existing SoftAP network configuration process, and the intelligent device having the short-distance network configuration capability means that the intelligent device can switch to the short-distance transmission mode after receiving the first discovery packet of the mobile terminal such as the mobile phone. In this way, the intelligent device provided in this embodiment of this application is compatible with an existing SoftAP network configuration mode while supporting a new short-distance network configuration mode. If a mobile phone does not support the short-distance network configuration mode, the mobile phone may use the SoftAP network configuration mode. Therefore, the intelligent device provided in this embodiment of this application not only supports network configuration experience of a new mobile phone, but also covers the existing solution, and improves compatibility between old and new mobile phones.

In this embodiment of this application, the foregoing information related to the intelligent device includes a device identifier (ID) of the intelligent device and a first encryption key. In a process of subsequently performing network configuration on the intelligent device, the mobile phone that receives the first response packet may encrypt, based on the first encryption key, information to be transmitted to the intelligent device, then broadcast the information to the intelligent device without accessing the SoftAP of the intelligent device, and establish point-to-point secure communication with the intelligent device. This greatly simplifies the network configuration process and shortens time required for network configuration. Optionally, the first encryption key on an intelligent device side is usually randomly generated. Optionally, security-related information further includes a session ID, and the session ID is the same as the session ID in the first discovery packet sent by the mobile phone.

For example, a packet format of the first response packet is shown in Table 1.

TABLE 1

| Header | Type | Session ID | ID_type | ID_val | Key_type | Key_val |
| --- | --- | --- | --- | --- | --- | --- |
| Packet header content | Message type | Session ID | Device ID type | Device ID value | Encryption key type | Encryption key value |

For example, a length, a value, and detailed descriptions of each field in the first response packet are shown in Table 2.

TABLE 2

| Field | Length | Value | Description |
| --- | --- | --- | --- |
| Header | 18 Bytes | Packet header content | Packet header of the first response packet |
| Type | 2 Bytes | 0x0001 | Message type |
| Session ID | 2 Bytes | Randomly generated | Session ID |
| ID_type | 2 Bytes | 0x0001 | ID type |
| ID_val | 16 Bytes | Device ID value | Device ID value |
| Key_type | 2 Bytes | 0x0002 | Encryption key type |
| Key_val | 32 Bytes | Encryption key | Encryption key value |

For example, the packet header may include information such as a total length of the packet and a service name corresponding to the packet. The "Type" field indicates a current packet type. For example, when a value of "Type" is 0x0001, it indicates that a current packet is a first response packet, when a value of "Type" is 0x0002, it indicates that a current packet is an authentication request packet, when a value of "Type" is 0x0003, it indicates that a current packet is a second response packet, and when a value of "Type" is 0x0004, it indicates that a current packet is a network configuration packet. Each packet type corresponds to a different value of "Type". The session ID is unique in an entire network configuration process. Different types of packets in a same network configuration process carry a same session ID. "ID_type" may be considered as an indication value of the variable ID. For example, when a value of ID_type is 0x0001, it indicates that the variable is ID, and when a value of ID_type is 0x0002, it indicates that the variable is Key.

It should be understood that information carried in the first response packet provides a secure basis for exchanging an SSID and a password that are of a router between the mobile phone and the intelligent device and for associating user equipment with the intelligent device in a subsequent long-distance mode.

Specifically, the broadcasting a first response packet in the short-distance transmission mode may include: The intelligent device broadcasts the first response packet within the range of the first safe distance at first transmit power and a first transmit frequency, where the first transmit power is less than a preset transmit power threshold, and the first transmit frequency is greater than a preset frequency threshold. It should be understood that it is a key of the short-distance network configuration mode that the first response packet is sent in the short-distance transmission mode. Because the security-related information carried in the first response packet sent by the intelligent device to the mobile phone is in plaintext, an effective distance (namely, the foregoing range of the first safe distance) at which the intelligent device sends the first response packet needs to be short enough to ensure that the security-related information is not received by another mobile phone outside a residence of the user, to ensure security.

Normally, Wi-Fi transmit power is high, and is usually 15 dBm to 20 dBm. The transmit power can maximize a range of a Wi-Fi connection on a premise that the transmit power meets certifications of the Federal Communications Commission (FCC), the Conformite Europeenne (CE), and the State Radio Regulation Committee (SRRC). However, in this embodiment of this application, a safe distance for sending the first response packet by the intelligent device is required to be within 0.3 m. To achieve this objective, in this embodiment of this application, transmit power is reduced, so that the effective distance for sending the first response packet by the intelligent device is within 0.3 m. The distance between the mobile phone and the intelligent device needs to be less than 0.3 m, so that the mobile phone can receive the first response packet sent by the intelligent device. The following formula is used to calculate a propagation loss:

$$[Lfs]\ (dB)=32.44+20*\lg d\ (km)+20*\lg f\ (MHz)$$

Lfs is the propagation loss in decibel (dB), d is an effective transmission distance in kilometers (km), lg is log, and f is a radio air interface frequency in megahertz (MHz). In this embodiment of this application, the formula should meet the following: d=0.0003 km, and f=2400 MHz. It should be understood that 0.3 m is a safe distance agreed by a relevant safety standard, 2400 MHz is a known value, and Lfs=29.59 is obtained through calculation by using the foregoing formula. It is assumed that according to the 802.11b standard, when sensitivity on a receive side reaches −95 dBm, a packet cannot be received. If transmit power at an effective transmit distance of 0.3 m is −95 dBm, and the transmit power is obtained when a packet is transmitted 0.3 m and 29.59 dB is lost, original transmit power before loss may be about −65 dBm obtained through calculation. If the 802.11b standard is met, when the transmit power is-65 dBm, an effective distance for sending information is 0.3 m, and when the transmit power is less than −65 dBm, the effective distance for sending the information is less than 0.3 m. Certainly, 802.11n Modulation and Coding Scheme 0 (MSC0) (in this standard, a packet cannot be received when sensitivity on a receive side reaches −75 dBm) or other standards with lower sensitivity may be used. In this case, transmit power increases accordingly. It should be understood that sensitivity corresponding to −95 dBm is higher than sensitivity corresponding to −75 dBm.

In addition, a receiving success rate further needs to be ensured, and time for network configuration needs to be shortened. However, reducing transmit power causes an increase in a bit error rate and a packet loss rate at a receive end. Consequently, the receiving success rate is reduced. To resolve this problem, this embodiment of this application provides the following two solutions:

1: Increase a frequency of broadcasting the first response packet by the intelligent device.

In an optional case, the frequency of broadcasting the first response packet may be, for example, 200 times per second, and at the sending frequency, the receiving success rate may reach 99%.

2: Configure a register value related to a sending success rate, to increase a sending success rate of each packet.

It should be understood that the sending success rate mainly depends on a CCA threshold and receiver sensitivity. Higher receiver sensitivity indicates a stronger capability of the device to detect surrounding interference, and a lower CCA threshold indicates a shorter transmit time window. To improve the sending success rate, the receiver sensitivity of the intelligent device needs to be reduced, and the CCA threshold needs to be increased. Reducing the receiver sensitivity of the intelligent device can reduce the capability of the intelligent device to detect surrounding interference, shield interference of remote information to the intelligent device, and improve a capability of sending a signal. Increasing the CCA threshold can increase the transmit time window, decrease a receive time window, and improve the capability of sending the signal. Specifically, the receiver sensitivity may be reduced by setting a value of a hardware register. The hardware register may be, for example, a radio frequency (Radio frequency, RF) register. The CCA threshold is also adjusted by setting the hardware register. The CCA threshold may, for example, be stored in a baseband register. In an optional case, a plurality of hardware registers are included, and values representing the transmit power, the receiver sensitivity, and the CCA threshold are respectively stored in different registers. For example, the transmit power is set by configuring a register corresponding to the transmit power, the receiver sensitivity is set by configuring a register corresponding to the receiver sensitivity, and the CCA threshold is set by configuring a register corresponding to the CCA threshold.

The following provides an example of a configuration example in this embodiment of this application.

1: A hardware register is configured to set the transmit power of the intelligent device to −65 dBm, so that an effective transmit distance is within 0.3 m.

2: A hardware register is configured to: set receiver sensitivity of the the intelligent device to −70 dm, set a CCA threshold to −10 dBm, and set a packet sending frequency to 200 times per second, to improve a success rate of sending the first response packet.

It should be understood that setting the transmit frequency is implemented by a service layer by invoking an API. Each time transmission is performed, the API interface is invoked.

S005: The mobile phone receives and parses the first response packet to obtain the device ID of the intelligent device and the first encryption key.

S006: The mobile phone verifies validity of the device ID.

It should be understood that the mobile phone implements preliminary verification of the validity of the intelligent device by verifying the device ID of the intelligent device. If the mobile phone detects that the device ID is an invalid ID, further interaction with the intelligent device is stopped.

To further improve reliability of security verification, key verification further needs to be performed between the mobile phone and the intelligent device. For example, the key verification may specifically include steps S007 to S010.

S007: The mobile phone broadcasts an authentication request packet, where the authentication request packet carries a first random number S.

For example, the authentication request packet further carries the session ID. It should be understood that the session ID is obtained by the mobile phone by parsing the first response packet, and the first random number is randomly generated by the mobile phone. The first random number is further stored in a memory of the mobile phone for subsequent use by the mobile phone side. For example, a packet format of the authentication request packet is shown in Table 3.

TABLE 3

| Header | Type | Session ID | S_type | S_len | S_val |
|---|---|---|---|---|---|
| Packet header content | Message type | Session ID | First random number type | First random number length | First random number value |

"S_val" of the first random number depends on a value of a length "S_len" of the first random number.

S008: The intelligent device parses the authentication request packet to obtain the first random number, and generates a first matching key based on the first random number.

For example, PSK authentication may be used to generate the first matching key. The intelligent device side may prestore a one-to-one correspondence between a PSK_ID and a PSK. After obtaining the first random number S, the intelligent device finds the PSK_ID corresponding to the first random number S, to obtain the PSK corresponding to the PSK_ID. Then, HMAC_SHA256 calculation is performed on the first random number S by using the PSK to obtain the first matching key S_SHA. Optionally, a length of the PSK may be 32 bytes.

It should be understood that, in addition to PSK authentication, a private key signature, public key signature verification, or the like may also be used.

S009: The intelligent device restores to a normal power mode, and broadcasts a second response packet to the mobile phone, where the second response packet carries the first matching key.

For example, the second response packet further carries the session ID and the PSK_ID.

It should be understood that the session ID is the same as the session identifier in each of the first response packet and the authentication request packet, and the second response packet is in response to the authentication request packet sent by the mobile phone.

For example, a packet format of the second response packet is shown in Table 5.

TABLE 5

| Header | Type | Session ID | PSKID_t | PSKID_val | SSHA_t | SSHA_Len | SSHA_val |
|---|---|---|---|---|---|---|---|
| Packet header content | Message type | Session ID | PSK index type | PSK index value | SHA type | SHA length | SHA value |

For example, a length, a value, and detailed descriptions of each field in the authentication request packet are shown in Table 4.

TABLE 4

| Field | Length | Value | Description |
|---|---|---|---|
| Header | 18 Bytes | Follow-up packet header content | Follow-up packet header |
| Type | 2 Bytes | 0x0002 | Message type |
| Session ID | 2 Bytes | The session ID is the same as the session ID in the first response packet | The session ID is obtained by parsing the first response packet |
| S_type | 2 Bytes | 0x0010 | First random number type |
| S_len | 2 Bytes | 0x0020 | First random number length |
| S_val | 32 Bytes | First random number value | The first random number is r randomly generated |

"Type" indicates a type of a packet, for example, indicates whether the packet is the first response packet or the authentication request packet. For example, when a value of Type is 0x0002, it indicates that the packet is the authentication request packet. It should be understood that a value For example, a length, a value, and detailed descriptions of each field in the second response packet are shown in Table 6.

TABLE 6

| Field | Length | Value | Description |
|---|---|---|---|
| Header | 18 Bytes | Packet header content | Packet header of the second response packet |
| Type | 2 Bytes | 0x0003 | Message type |
| Session ID | 2 Bytes | The session ID is the same as the session ID in the authentication request packet | The session ID is obtained by parsing the authentication request packet |
| PSKID_t | 2 Bytes | 0x0001 | PSK index type |
| PSKID_val | 2 Bytes | PSK_ID | PSK index ID |
| SSHA_t | 2 Bytes | 0x0002 | SHA type |
| SSHA_len | 2 Bytes | 0x0020 | SHA length |
| SSHA_val | 32 Bytes | SHA value | First matching key obtained through calculation based on the first random number |

S010: The mobile phone parses the received second response packet to obtain the first matching key, and verifies validity of the intelligent device based on the first matching key.

Specifically, the mobile phone parses the second response packet to obtain the PSK_ID, and obtains the prestored PSK based on the PSK_ID.

It should be understood that, the mobile phone side prestores a one-to-one correspondence that is between a PSK_ID and a PSK and that is the same as the correspondence between the PSK_ID and the PSK on the intelligent device side. After obtaining the PSK_ID, the mobile phone may obtain the PSK corresponding to the PSK_ID. Further, the mobile phone performs HMAC_SHA256 calculation on the first random number S carried in the authentication request packet by using the PSK to obtain a second matching key S_SHA1. Then, the mobile phone verifies the validity of the intelligent device by comparing whether S_SHA1 is equal to S_SHA. When S_SHA1 is equal to S_SHA, the intelligent device is considered valid.

It should be understood that a security verification algorithm used by the mobile phone is consistent with that used by the intelligent device. If the intelligent device uses a private key signature, the mobile phone also uses a private key signature. If the intelligent device uses public key signature verification, the mobile phone also uses public key signature verification. In an optional case, after verifying that the intelligent device is valid, the mobile phone displays obtained intelligent device-related information such as the device ID, a device type, and a corresponding device icon on an interface of the mobile phone.

S011: After verifying the validity of the intelligent device, the mobile phone broadcasts a network configuration packet, where the network configuration packet carries decrypted router-related information.

It should be understood that the router-related information is information required for associating with the router, and the router-related information includes the SSID and the password that are of the router.

For example, the mobile phone encrypts the router-related information based on the first encryption key obtained from the first response packet. In an optional case, the mobile phone may encrypt the router-related information based on the first encryption key and the first random number. For example, the mobile phone first performs calculation on the first encryption key and the first random number by using a PBKDF2 algorithm, to generate a second encryption key, and then encrypts the router-related information by using the second encryption key and an AES128 algorithm. It should be understood that the router-related information may further include a channel, where the channel indicates a channel occupied by the router to propagate a message.

For example, the encrypted router-related information is carried in the network configuration packet, and a format of the network configuration packet is shown in Table 7.

TABLE 7

| Header | Packet header content |
|---|---|
| Type | Message type |
| Session ID | Session ID |
| Asso_t | Association type |
| mode | Association mode |
| Chan | Channel ID |

TABLE 7-continued

| Header | Packet header content |
|---|---|
| SSID_L | Router SSID length |
| SSID_val | Router SSID value |
| PWD_L | Router password length |
| PWD_val | Router password value |

For example, a length, a value, and detailed descriptions of each field in the network configuration packet are shown in Table 8.

TABLE 8

| Field | Length | Value | Description |
|---|---|---|---|
| Follow-up header | 18 Bytes | Follow-up content | Follow-up packet header |
| Type | 2 Bytes | 0x0004 | Message type |
| Session ID | 2 Bytes | The session ID is the same as the session ID in the second response packet | Session ID |
| Asso_t | 2 Bytes | 0x0001 | Association type |
| Mode | 1 Byte | 0x00: open 0x01: WPA 0x02: WPA 2 0x03: WPA 3 | Association mode |
| Channel | 1 Byte | 1 to 13 channels, and a value 0 indicates that a channel is not specified | Channel ID |
| SSID_1 | 2 Bytes | 0x0020 | Router SSID length |
| SSID_val | 32 Bytes | Router SSID value | Router SSID value |
| PWD_1 | 2 Bytes | 0x0020 | Router password length |
| PWD_val | 32 Bytes | Router password value | Router password value |

It should be understood that the association type may be considered as indication values of variables Mode, Channel, SSID, and PWD, and the association mode indicates a mode of association between the intelligent device and the router. For example, the association mode includes "open", "WPA", "WPA 2", and "WPA 3", where "open" indicates open system authentication, "WPA" indicates Wi-Fi protected access, "WPA 2" indicates Wi-Fi protected access 2, and "WPA 3" indicates Wi-Fi protected access 3. Open indicates an open network, and the network is insecure. WPA uses a PSK and a temporal key integrity protocol for encryption and is vulnerable to intrusion after proof of concept and application public demonstration. WPA 2 uses an AES for encryption. WPA 2 is more secure than WPA and can protect home networks. However, for WPA 2, there are still vulnerabilities that can be attacked for enterprise networks. WPA 3 is a next-generation wireless security standard protocol. WPA 3 uses simultaneous authentication of equals (SAE) to encrypt data in a forward direction. Even if a hacker obtains a password of a wireless network, the hacker cannot decrypt information in an old data packet that is sent out. WPA 3 supports opportunistic wireless encryption (OWE) technology, so that data encryption on public wireless networks is enhanced, and data communication security between devices and wireless hotspots is ensured.

The channel ID indicates a channel occupied by a router to send information, and the channel is generally different from a channel used by the SoftAP to send information, but the two channels may also be the same. When the channel ID is 0, it indicates that a channel of the router is not specified. When the channel ID is 1 to 13, a value of the channel ID is a value of the channel occupied by the router to send information.

S012: The intelligent device receives the network configuration packet, and decrypts encrypted router-related information to obtain an SSID and a password that are of the router.

Specifically, after the intelligent device receives the network configuration packet, a payload part of the network configuration packet includes the encrypted router-related information. Correspondingly, the intelligent device uses the same method as the mobile phone. For example, the intelligent device decrypts the router-related information based on the first encryption key. In an optional case, the intelligent device decrypts the router-related information based on the first encryption key and the first random number. For example, the intelligent device first performs calculation on the first encryption key and the first random number by using the PBKDF2 algorithm to generate a second encryption key, and then decrypts a payload of the network configuration packet by using the second encryption key and the AES128 algorithm, to obtain information such as the SSID and the password that are of the router. Optionally, other router-related information such as a channel and an association mode may also be obtained.

S013: The intelligent device connects to the router based on the SSID and the password that are of the router.

S014: After being connected to the router, the intelligent device registers with a cloud device.

Further, the intelligent device further sends a connection result with the router and a registration result on the cloud to the mobile phone.

Specifically, after enabling the STA mode, the intelligent device connects to the router based on the SSID and the password that are of the router. It should be understood that after the intelligent device is connected to the router, the STA mode needs to be always enabled, and the STA mode and the AP mode coexist. It should be understood that the router is usually a router at home.

For example, when registering with the cloud, the intelligent device may carry a device ID of the intelligent device, device information, a media access control (Media Access Control, MAC) address, and the like.

S015: The mobile phone sends, to the cloud device, the device ID that is of the intelligent device and that is obtained based on the first response packet, to associate the intelligent device with a user account.

For example, the user account may be a user account used by the user to log in to an application program, or may be a family account of the user. All intelligent devices having access to the internet in the home of the user are associated with the family account. For example, when the device ID sent by the mobile phone to the cloud device is consistent with the device ID of the intelligent device during registration, the cloud device associates the intelligent device with the user account to which the mobile phone belongs.

It should be understood that in this embodiment of this application, steps S001 to S010 are a discovery authentication phase. In this phase, the mobile phone discovers the intelligent device, and verifies validity of the intelligent device. Steps S011 to S015 are a network configuration association phase. In the network configuration association phase, the mobile phone encrypts the SSID and password information that are of the router and sends the encrypted information to the intelligent device. The intelligent device connects to the router, registers with the cloud, and associates with the user account.

This embodiment of this application further includes a control phase, and the control phase specifically includes steps S016 to S018.

S016: The mobile phone broadcasts a control packet, where the control packet carries encrypted control information.

It should be understood that the mobile phone may encrypt the control information based on the first encryption key obtained from the first response packet. In an optional case, the mobile phone encrypts the control information based on the first encryption key and the first random number. For example, the mobile phone first performs calculation on the first encryption key and the first random number by using the PBKDF2 algorithm to generate a second encryption key, and then encrypts the control information by using the second encryption key and the AES128 algorithm.

It should be understood that S016 may be performed after S010, that is, after verifying that the intelligent device is valid, the mobile phone may send the control information to the intelligent device without waiting until the intelligent device completes registration with the cloud and associates with the user account. In this way, after the mobile phone discovers and verifies that the intelligent device is valid, the mobile phone can control the intelligent device. This saves waiting time for the intelligent device to connect to a network, register, and associate with the user account, and improves user experience. However, in this case, because the intelligent device is not associated with the user account, and the control information is encrypted, only the intelligent device having a key can decrypt the control information. This improves control security and accuracy.

In an optional case, the control information may be sent to the intelligent device after the intelligent device successfully registers with the cloud and is successfully associated with the user account. In this case, the control information may be in plaintext and does not need to be encrypted.

S017: The intelligent device decrypts the encrypted control information to obtain the control information in plaintext and performs an operation indicated by the control information in plaintext.

It should be understood that the decryption method of the intelligent device is corresponding to the encryption method of the mobile phone. For example, the intelligent device decrypts the encrypted control information based on the first encryption key. In an optional case, the intelligent device decrypts the encrypted control information based on the first encryption key and the first random number. For example, the intelligent device first performs calculation on the first encryption key and the first random number by using the PBKDF2 algorithm to generate a second encryption key, and then decrypts a payload of the control packet by using the second encryption key and the AES128 algorithm, to obtain the control information in plaintext.

S018: The intelligent device broadcasts a third response packet, where the third response packet carries an execution result of the intelligent device and status information of the intelligent device.

For example, the intelligent device is a corridor lamp, and the control information sent by the mobile phone is "turning on the corridor lamp". After performing the "turning on" operation, the intelligent device sends execution result information such as "turning on successfully" or "fail to turn on" to the mobile phone. Correspondingly, a status of the intelligent device may be viewed on an app interface of the mobile phone. It should be understood that, if the execution result includes sensitive information, the execution result and a related status may be encrypted based on the first encryption key or based on the first encryption key and the first random number, and then carried in the third response packet and sent to the mobile phone.

In the conventional technology, a mobile phone can send control information to the intelligent device only after the intelligent device is associated with a router and registered with a cloud device. However, in this embodiment of this application, in a process in which the intelligent device is connected to the router, the mobile phone may directly control the intelligent device. In addition, the intelligent device may actively report a status change or response information to the mobile phone. That is, the network configuration association phase corresponding to the foregoing steps S011 to S014 and the control phase corresponding to the steps S015 to S017 may be parallel. To be specific, there is no need to wait until network association succeeds before the intelligent device is controlled. In this way, a control process is more direct and convenient.

In the short-distance network configuration mode in this embodiment of this application, after receiving the first discovery packet broadcast by the first terminal, the intelligent device broadcasts the device identifier and the first encryption key that are in plaintext within the first safe distance. Because the device identifier and the first encryption key are in plaintext, to ensure security of the plaintext information, a distance for sending the first response packet needs to be short enough (does not exceed the first safe distance), so that the plaintext information is not received by another mobile phone outside a residence of a user. In this way, security of the plaintext information is ensured. Further, after receiving the device identifier and the first encryption key that are in plaintext, the first terminal may broadcast to-be-sent information (for example, information required for network configuration association and control information) after the to-be-sent information is encrypted based on the first encryption key. In this way, because only the intelligent device and the first terminal located within a range of the first safe distance from the intelligent device have the first encryption key, it is ensured that information broadcast in a network configuration process cannot be decrypted by another device. This ensures network configuration security while simplifying the network configuration process. The network configuration packet exchanged between the intelligent terminal and the first terminal in the network configuration process is also encrypted and broadcast. Therefore, in the entire network configuration process, the first terminal does not need to scan and discover the intelligent device and connect to a hotspot of the intelligent device, and does not need to establish point-to-point secure communication with the intelligent device. Therefore, a network configuration speed is greatly improved, and the entire network configuration process is shortened from 10 seconds to 2 seconds. Moreover, in the short-distance network configuration mode, device discovery is more accurate, and a mismatch is more effectively prevented. Further, the user can associate the intelligent device with the user account without scanning QR code. This improves efficiency and user experience of initial use of the intelligent device, and makes a product more competitive.

It should be understood that in this embodiment of this application, an example in which a mobile phone configures a network for an intelligent device is used for description, and may be further used in a scenario in which a device configures a network for a device, for example, a scenario in which a router configures a network for a device. In addition to a network configuration scenario, this embodiment of this application is further applicable to another scenario in which short-distance Wi-Fi transmission is required, for example, a device control scenario.

Figure 3:
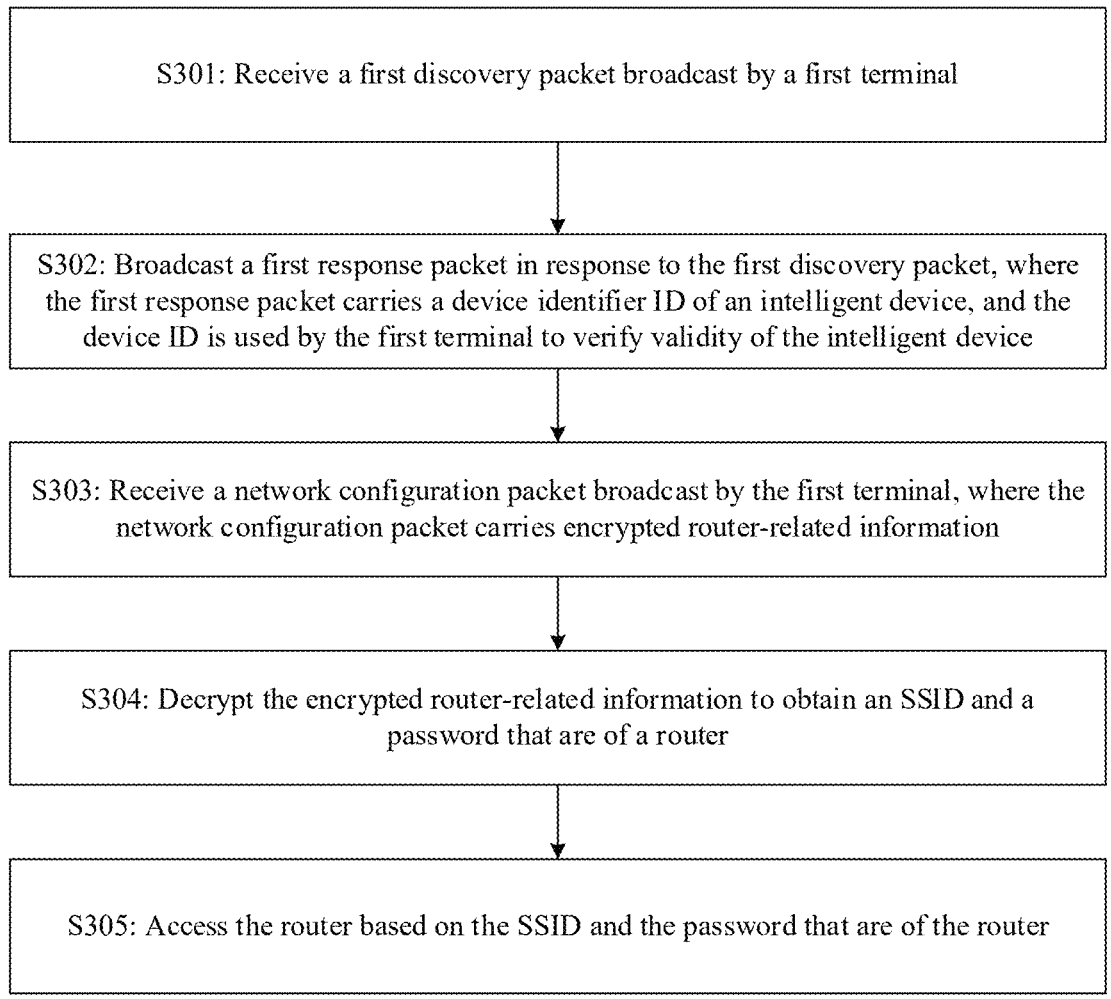
FIG. 3 is a flowchart of an example of a network configuration method for an intelligent device according to an embodiment of this application.

FIG. 3 is a flowchart of an example of a network configuration method for an intelligent device according to an embodiment of this application. For example, the method may be executed by an intelligent device, a processor chip or a function module on the intelligent device, or the like. As shown in FIG. 3, the method includes the following steps.

S301: Receive a first discovery packet broadcast by a first terminal.

S302: Broadcast a first response packet in response to the first discovery packet, where the first response packet carries a device identifier ID of an intelligent device, and the device ID is used by the first terminal to verify validity of the intelligent device.

In a possible implementation, the first response packet is broadcast in a short-distance transmission mode in response to the first discovery packet, where in the short-distance transmission mode, a sending distance of the first response packet does not exceed a first safe distance.

It should be understood that the first terminal can obtain related information of the intelligent device based on the first response packet. If a terminal that sends a discovery packet is located outside a range of the first safe distance, the terminal cannot receive the first response packet of the intelligent device. In this way, a mobile terminal (for example, a mobile phone outside a user's house) that is outside the range of the first safe distance can be effectively prevented from receiving the first response packet of the intelligent device. Therefore, security of network configuration is improved. For example, the first safe distance may be 0.3 m.

In a possible implementation, in the short-distance transmission mode, the intelligent device broadcasts the first response packet at first transmit power and a first transmit frequency, where the first transmit power is less than a preset transmit power threshold, and the first transmit frequency is greater than a preset frequency threshold.

It should be understood that a distance for sending the first response packet does not exceed the foregoing first safe distance by using the first transmit power. Normally, Wi-Fi transmit power is high, and is usually 15 dBm to 20 dBm. To ensure that an effective distance for sending the first response packet is short enough to ensure that security-related information is not received by another mobile phone outside the residence of the user, in this embodiment of this application, the transmit power is reduced, so that the distance for sending the first response packet does not exceed the first safe distance. For example, when the first transmit power is less than-65 dBm, the effective distance for sending the first response packet is less than 0.3 m. However, reducing the transmit power causes an increase in a bit error rate and a packet loss rate at a receive end, and reduces a receiving success rate. In this embodiment of this application, a packet receiving success rate is improved by increasing a transmit frequency for sending the first response packet. For example, the first transmit frequency may be 200 times per second. For example, a service layer of the intelligent device sets the first transmit frequency by invoking an API.

In a possible implementation, in the short-distance transmission mode, receiver sensitivity of the intelligent device is reduced, and a CCA threshold of the intelligent device is increased.

A sending success rate depends on the CCA threshold and the receiver sensitivity. Higher receiver sensitivity indicates a stronger capability of the device to detect surrounding interference, and a lower CCA threshold indicates a shorter transmit time window. Reducing the receiver sensitivity of the intelligent device can reduce the capability of the intelligent device to detect surrounding interference, shield interference of remote information to the intelligent device, and improve a capability of sending a signal. Increasing the CCA threshold can increase the transmit time window, decrease a receive time window, and improve the capability of sending the signal. In this embodiment of this application, the packet receiving success rate is further improved by reducing the receiver sensitivity and increasing the CCA threshold. For example, a value of a radio frequency RF register is set, to reduce the receiver sensitivity of the intelligent device, and a value of a baseband register is set, to increase the CCA threshold of the intelligent device. The receiver sensitivity may be set to −70 dm, and the CCA threshold may be set to −10 dBm.

In a possible implementation, before receiving the first packet, the intelligent device periodically broadcasts a beacon frame through a SoftAP, where the beacon frame includes capability-related information of the intelligent device. In this way, surrounding intelligent terminals can detect the intelligent device through scanning, and configure a network for the intelligent device through the SoftAP connected to the intelligent device. After receiving the first discovery packet, the intelligent device stops the SoftAP from broadcasting the beacon frame, and enters the short-distance transmission mode.

In a possible implementation, a time interval at which the beacon frame is broadcast is 100 ms, and the beacon frame is broadcast on a specified channel.

It should be understood that, after being powered on, the intelligent device has both a SoftAP network configuration capability and a short-distance network configuration capability. It should be understood that, the intelligent device having the SoftAP network configuration capability means that the intelligent device can periodically send the beacon frame, so that the mobile phone can discover the intelligent device through scanning, and perform network configuration on the intelligent device based on an existing SoftAP network configuration process; and the intelligent device having the short-distance network configuration capability means that the intelligent device can switch to the short-distance transmission mode after receiving the first discovery packet of a mobile terminal such as a mobile phone. In this way, the intelligent device provided in this embodiment of this application is compatible with an existing SoftAP network configuration mode while supporting a new short-distance network configuration mode. If a mobile phone does not support the short-distance network configuration mode, the mobile phone may use the SoftAP network configuration mode. Therefore, the intelligent device provided in this embodiment of this application not only supports network configuration experience of a new mobile phone, but also covers the existing solution, and improves compatibility between old and new mobile phones.

S303: Receive a network configuration packet broadcast by the first terminal, where the network configuration packet carries encrypted router-related information.

For example, the information related to the router includes an SSID and a password that are of a router.

For example, the first response packet includes the device identifier ID of the intelligent device and a first encryption key that are in plaintext. Optionally, the encrypted router-related information is obtained by the first terminal through encryption based on the first encryption key. Generally, the first discovery packet carries a session identifier, and correspondingly, the first response packet carries a same session identifier. Based on the same session identifier, the intelligent device and the first terminal may determine that received packet information belongs to a same session.

In an optional case, before the intelligent device receives the encrypted router-related information sent by the first terminal, the first terminal may first perform validity authentication on the intelligent device. Specifically, the first terminal first verifies validity of the device ID of the intelligent device. When the device ID is valid, the intelligent device receives an authentication request packet sent by the first terminal, where the authentication request packet includes a first random number. The intelligent device generates a first matching key based on the first random number. The intelligent device broadcasts the first response packet in the short-distance transmission mode by using the first transmit power. When the first terminal performs validity authentication, the intelligent device restores to a normal power mode and broadcasts a second response packet to the first terminal, where the second response packet includes a first matching key, and the first matching key is used by the first terminal to verify validity of the intelligent device. After the validity authentication of the intelligent device succeeds, the intelligent device receives the encrypted router-related information sent by the first terminal.

In this embodiment of this application, if a terminal detects that an intelligent device is an unauthorized device, for example, a device ID of the intelligent device is not in a whitelist of the terminal, or a matching key exchanged between the intelligent device and the terminal is inconsistent, the terminal stops further interaction with the intelligent terminal. This avoids a mismatch, and improves accuracy and security of network configuration.

S304: Decrypt the encrypted router-related information to obtain the SSID and the password that are of the router.

For example, the method for decrypting the router-related information by the intelligent device corresponds to the encryption method used by the first terminal. For example, the intelligent device decrypts the encrypted router-related information based on the first encryption key, to obtain the SSID and the password that are of the router.

S305: Access the router based on the SSID and the password that are of the router.

It should be understood that after the router is connected, the method further includes:

The intelligent device sends registration information to a cloud device, where the registration information includes the device identifier ID of the intelligent device.

Further, the intelligent device further feeds back a result of association with the router, a result of registration with the cloud device, and a result of association with a user account to the first terminal.

In this embodiment of this application, after the validity authentication of the intelligent device succeeds, the method further includes: The intelligent device receives a control packet broadcast by the first terminal, where the control packet carries encrypted control information, and the encrypted control information is obtained by encrypting based on the first encryption key; the intelligent device decrypts the encrypted control information based on the first encryption key, to obtain the control information in plaintext; the intelligent device performs an operation indicated by the control information in plaintext; and the intelligent device sends a third response packet to the first terminal, where the third response packet carries at least one of an execution result of the intelligent device or status information of the intelligent device.

In an optional case, before the network configuration packet broadcast by the first terminal is received, the method further includes: receiving a control packet broadcast by the first terminal, where the control packet carries encrypted control information; decrypting the encrypted control information to obtain the control information in plaintext; performing an operation indicated by the control information in plaintext; and broadcasting a third response packet to the first terminal, where the third response packet carries at least one of an execution result of the intelligent device or status information of the intelligent device.

According to the network configuration method provided in this embodiment of this application, a terminal obtains information about an intelligent device by broadcasting a discovery packet and receiving a response packet broadcast by the intelligent device. The terminal does not need to scan and discover a hotspot of the intelligent device, and does not need to be connected to the intelligent device, and does not need to establish point-to-point secure communication with the intelligent device. In this way, a network configuration process is greatly simplified, and a network configuration speed is greatly improved. Further, in the short-distance network configuration mode, because a distance between the terminal and the intelligent device is close, device discovery is more accurate, and a mismatch can be effectively prevented, a network configuration success rate is greatly improved. In addition, after verifying that the intelligent device is valid, the terminal may send the control information to the intelligent device without waiting until the intelligent device completes registration with a cloud and associates with a user account. In this way, after the terminal discovers and verifies that the intelligent device is valid, the terminal can control the intelligent device. This saves waiting time for the intelligent device to connect to a network, register, and associate with a user account, and improves user experience.

Figure 4:
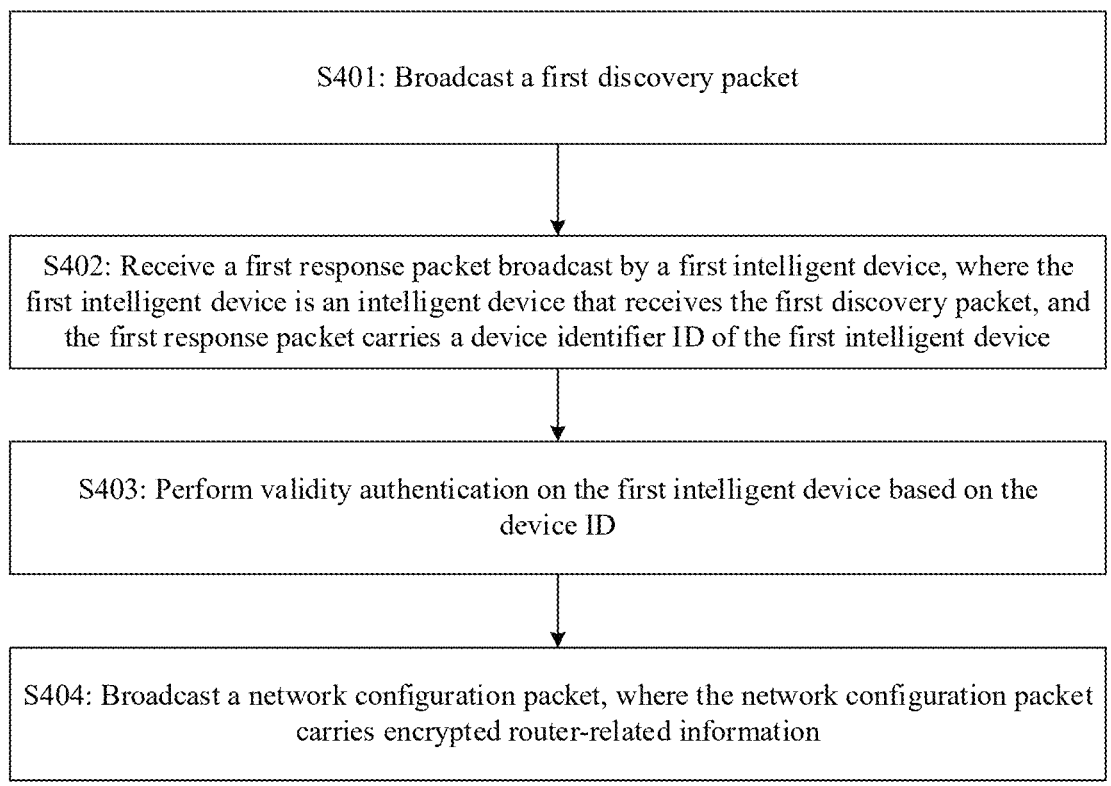
FIG. 4 is a flowchart of an example of a network configuration method for an intelligent device according to an embodiment of this application.

FIG. 4 is a flowchart of an example a network configuration method for an intelligent device according to an embodiment of this application. For example, the method may be executed by a first terminal, a processor chip or a function module on the first terminal, or the like. The first terminal may be various wearable devices such as a mobile phone, an iPad, or a smartwatch. Alternatively, the first terminal may be an intelligent mobile terminal such as a tablet computer. As shown in FIG. 4, the method includes the following steps.

S401: Broadcast a first discovery packet.

For example, the first discovery packet carries a session ID, and related packets in an entire subsequent process of network configuration between a first terminal and an intelligent device carry a same session ID, to indicate that the related packets all belong to a same session. Before receiving the first discovery packet, the intelligent device periodically broadcasts a beacon frame through a SoftAP. In this way, surrounding intelligent terminals may discover the intelligent device through scanning, and perform network configuration for the intelligent device through the SoftAP connected to the intelligent device. After receiving the first discovery packet, the intelligent device stops the SoftAP from broadcasting the beacon frame, and enters a short-distance transmission mode.

S402: Receive a first response packet broadcast by a first intelligent device, where the first intelligent device is an intelligent device that receives the first discovery packet, and the first response packet carries a device identifier ID of the first intelligent device.

In an optional case, the first response packet is received within a range of a first safe distance from the first intelligent device, where the first response packet carries the device ID of the first intelligent device and a first encryption key that are in plaintext, and the first encryption key is a key used to encrypt router-related information and control information.

It should be understood that, if a distance from the intelligent device exceeds the first safe distance, the first response packet cannot be received. This can effectively prevent a mobile terminal (for example, a mobile phone outside a user's house) that is outside the range of the first safe distance from receiving the first response packet of the intelligent device. Therefore, a terminal whose distance from the first intelligent device exceeds the first safe distance cannot obtain the device ID and the first encryption key that are in plaintext, so that security of network configuration is improved. Further, in a short-distance network configuration mode, because a distance between the terminal and the intelligent device is close, device discovery is more accurate, and a mismatch can be effectively prevented.

S403: Perform validity authentication on the first intelligent device based on the device ID.

It should be understood that, after the first response packet of the first intelligent device is obtained, validity of the first intelligent device is preliminarily verified based on the device ID carried in the first response packet. When the device ID of the intelligent device is not in a whitelist of the terminal, the terminal stops further interaction with the intelligent terminal. This avoids a mismatch, and further avoids wasting communication signaling.

S404: Broadcast a network configuration packet, where the network configuration packet carries the encrypted router-related information.

In an optional case, the received first response packet carries the first encryption key in plaintext, and the first terminal encrypts the router-related information based on the first encryption key. For example, the router-related information includes a service set identifier SSID and a password that are of a router, where the SSID and the password that are of the router are used by the first intelligent device to access the router.

This embodiment of this application provides a simplified network configuration procedure. The intelligent device and the first terminal discover existence of each other by broadcasting the first discovery packet and the first response packet. Further, the network configuration packet exchanged between the intelligent terminal and the first terminal in a network configuration process is also encrypted and broadcast. Therefore, in the entire network configuration process, the first terminal does not need to access a SoftAP of the intelligent device, and does not need to establish point-to-point secure communication with the intelligent device. This greatly simplifies the network configuration process and shortens time required for network configuration.

In an optional case, after it is determined that the device ID of the first intelligent device is valid, and before the network configuration packet is broadcast, the method further includes: broadcasting an authentication request packet, where the authentication request packet carries a first random number; receiving a second response packet broadcast by the first intelligent device, where the second response packet carries a first matching key, and the first matching key is generated based on the first random number; generating a second matching password based on the first random number; when the first matching key is equal to the second matching key, determining that the first intelligent device is valid.

In an optional case, the router-related information is encrypted based on the first encryption key and the first random number.

In this embodiment of this application, if a terminal detects that an intelligent device is an unauthorized device, for example, a device ID of the intelligent device is not in a whitelist of the terminal, or a matching key exchanged between the intelligent device and the terminal is inconsistent, the terminal stops further interaction with the intelligent terminal. This avoids a mismatch, and improves accuracy and security of network configuration.

In a possible implementation, the method further includes: sending the device ID obtained based on the first response packet to a cloud device. In this way, the cloud device associates the intelligent device with a user account.

In a possible implementation, after the intelligent device is verified to be valid, the method further includes: broadcasting a control packet, where the control packet carries encrypted control information; and receiving a third response packet of the intelligent terminal, where the third response packet carries at least one of an execution result of the intelligent device or status information of the intelligent device.

In this embodiment of this application, after verifying that the intelligent device is valid, the terminal may broadcast the control information to the intelligent device without waiting until the intelligent device completes registration with the cloud and associates with the user account. In this way, after the terminal discovers and verifies that the intelligent device is valid, the terminal can control the intelligent device. This saves waiting time for the intelligent device to connect to a network, register, and associate with a user account, and improves user experience.

In a possible implementation, the method further includes: receiving an association result fed back by the intelligent device; and sending a control packet to the intelligent device after the intelligent device is successfully associated with the user account.

In this embodiment of this application, after the intelligent device successfully registers with the cloud and is successfully associated with the user account, the intelligent device sends the control information to the intelligent device. This is compatible with the conventional technology.

Figure 5A:
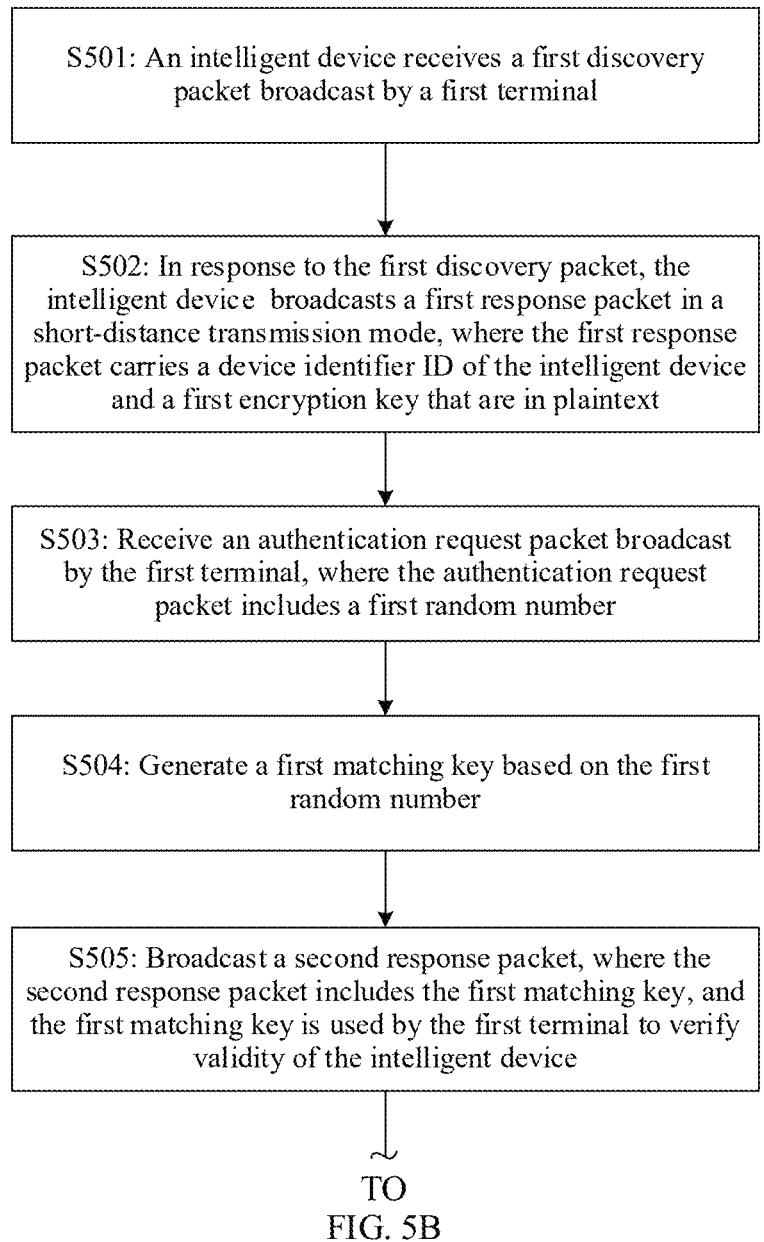
FIG. 5A and FIG. 5B are a flowchart of an example of a network configuration method for an intelligent device according to an embodiment of this application.
Figure 5B:
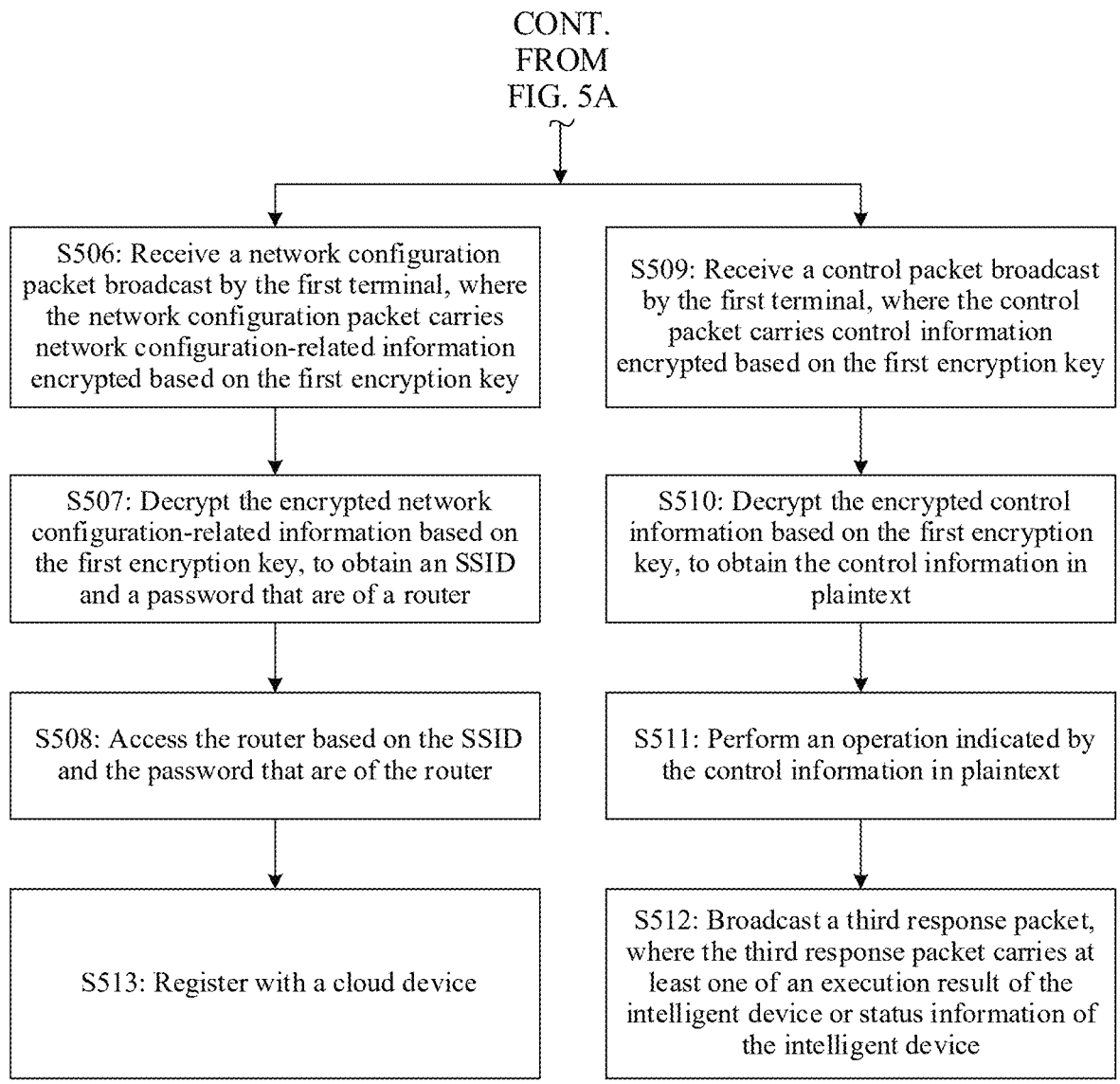

FIG. 5A and FIG. 5B are a flowchart of an example of a network configuration method for an intelligent device according to an embodiment of this application. For example, the method may be executed by an intelligent device, a processor chip or a function module on the intelligent device, or the like. As shown in FIG. 5A and FIG. 5B, the method includes the following steps.

S501: An intelligent device receives a first discovery packet broadcast by a first terminal.

S502: In response to the first discovery packet, the intelligent device broadcasts a first response packet in a short-distance transmission mode, where the first response packet carries a device identifier ID of the intelligent device and a first encryption key that are in plaintext.

For example, in the short-distance transmission mode, a sending distance of the first response packet does not exceed a first safe distance, and the first encryption key is used by the first terminal to encrypt information to be sent to the intelligent device, where the information to be sent to the intelligent device includes network configuration-related information.

In this embodiment of this application, after receiving the first discovery packet broadcast by the first terminal, the intelligent device broadcasts the device identifier and the first encryption key that are in plaintext within the first safe distance. Because the device identifier and the first encryption key are in plaintext, to ensure security of the plaintext information, a distance for sending the first response packet needs to be short enough (does not exceed the first safe distance), so that the plaintext information is not received by another mobile phone outside a residence of a user. In this way, security of the plaintext information is ensured. Further, after receiving the device identifier and the first encryption key that are in plaintext, the first terminal may broadcast to-be-sent information (for example, information required for network configuration association and control information) after the to-be-sent information is encrypted based on the first encryption key. In this way, because only the intelligent device and the first terminal located within a range of the first safe distance from the intelligent device have the first encryption key, it is ensured that information broadcast in a network configuration process cannot be decrypted by another device. This ensures network configuration security while simplifying the network configuration process.

In a possible implementation, in the short-distance transmission mode, the intelligent device broadcasts the first response packet at first transmit power and a first transmit frequency, where the first transmit power is less than a preset transmit power threshold, and the first transmit frequency is greater than a preset frequency threshold.

In a possible implementation, in the short-distance transmission mode, receiver sensitivity of the intelligent device is reduced, and a clear channel assessment CCA threshold of the intelligent device is increased.

In a possible implementation, the method further includes: before the first discovery packet is received, periodically broadcasting a beacon (beacon) frame by using a soft access point SoftAP, where the beacon frame includes capability-related information of the intelligent device; and after the first discovery packet is received, stopping the SoftAP from broadcasting the beacon frame, and entering the short-distance transmission mode.

In a possible implementation, after the first response packet is broadcast in the short-distance transmission mode, the method further includes the following steps. S506: Receive a network configuration packet broadcast by the first terminal, where the network configuration packet carries network configuration-related information encrypted based on the first encryption key, and the network configuration-related information includes a service set identifier SSID and a password that are of the router. S507: Decrypt the encrypted network configuration-related information based on the first encryption key, to obtain the SSID and the password that are of the router. S508: Access the router based on the SSID and the password that are of the router.

In this embodiment of this application, the intelligent device and the first terminal have a same first encryption key, and the first encryption key cannot be obtained by another terminal located outside the range of the first safe distance. Therefore, the network configuration-related information may be broadcast after being encrypted based on the first encryption key, the first terminal does not need to access the SoftAP of the intelligent device, and does not need to establish point-to-point secure communication with the intelligent device. This greatly simplifies a network configuration process.

In a possible implementation, before the network configuration packet broadcast by the first terminal is received, the method further includes the following steps. S503: Receive an authentication request packet broadcast by the first terminal, where the authentication request packet includes a first random number. S504: Generate a first matching key based on the first random number. S505: Broadcast a second response packet, where the second response packet includes the first matching key, and the first matching key is used by the first terminal to verify validity of the intelligent device.

In this embodiment of this application, if a terminal detects that an intelligent device is an unauthorized device, for example, a device ID of the intelligent device is not in a whitelist of the terminal, or a matching key exchanged between the intelligent device and the terminal is inconsistent, the terminal stops further interaction with the intelligent terminal. This avoids a mismatch, and improves accuracy and security of network configuration.

In a possible implementation, the information to be sent to the intelligent device further includes control information, and after the validity authentication of the intelligent device succeeds, the method further includes the following steps. S509: Receive a control packet broadcast by the first terminal, where the control packet carries the control information encrypted based on the first encryption key. S510: Decrypt the encrypted control information based on the first encryption key, to obtain the control information in plaintext. S511: Perform an operation indicated by the control information in plaintext. S512: Broadcast a third response packet, where the third response packet carries at least one of an execution result of the intelligent device or status information of the intelligent device.

In a possible implementation, after the router is accessed, the method further includes S513. S513: Register with a cloud device.

For example, when registering with a cloud, the intelligent device may carry a device ID, device information, a MAC address, and the like of the intelligent device.

It should be understood that S506 to S508 are a process of performing network configuration association on the intelligent device, S509 to S512 are a process of controlling the intelligent device, and S506 to S508 and S509 to S512 may be performed concurrently, that is, in this embodiment of this application, in a process of performing network configuration on the intelligent device, the intelligent device may be controlled. There is no need to wait until the intelligent device completes network configuration, registers with the cloud, and associates with a user account. This saves waiting time for the intelligent device to connect to a network, register, and associate with the user account, and improves user experience.

It should be understood that, for ease of understanding, the method embodiments corresponding to FIG. 2A and FIG. 2B to FIG. 5A and FIG. 5B describe the method in a form of steps, but sequence numbers of the steps do not limit an execution sequence of the steps of the method.

In a possible implementation, the encrypted router-related information is carried in a network configuration packet, where the network configuration packet includes a packet header field, a packet type field, a session identifier field, an association type field, an association mode field, a channel ID field, a router SSID length field, a router SSID value field, a router password length field, and a router password value field. An association type indicates a type of an association-related variable, and the association-related variable includes an association mode, a channel ID, a router SSID, and a router password.

In a possible implementation, the authentication request packet includes a packet header field, a packet type field, a session identifier field, a random number type field, a random number length field, and a random value field.

In a possible implementation, the authentication request packet includes a packet header field, a packet type field, a session identifier field, a random number type field, a random number length field, and a random value field.

In a possible implementation, the second response packet includes a packet header field, a packet type field, a session identifier field, a PSK index type field, a PSK index length field, a PSK index value field, a matching key type field, a matching key length field, and a matching key value field.

In a possible implementation, the first response packet includes a packet header field, a packet type field, a session identifier field, a device ID type field, a device ID value field, an encryption key type field, and an encryption key value field. The packet type field indicates a type of the first response packet, and a session identifier in the session identifier field is consistent with a session identifier carried in the first discovery packet.

Figure 6:
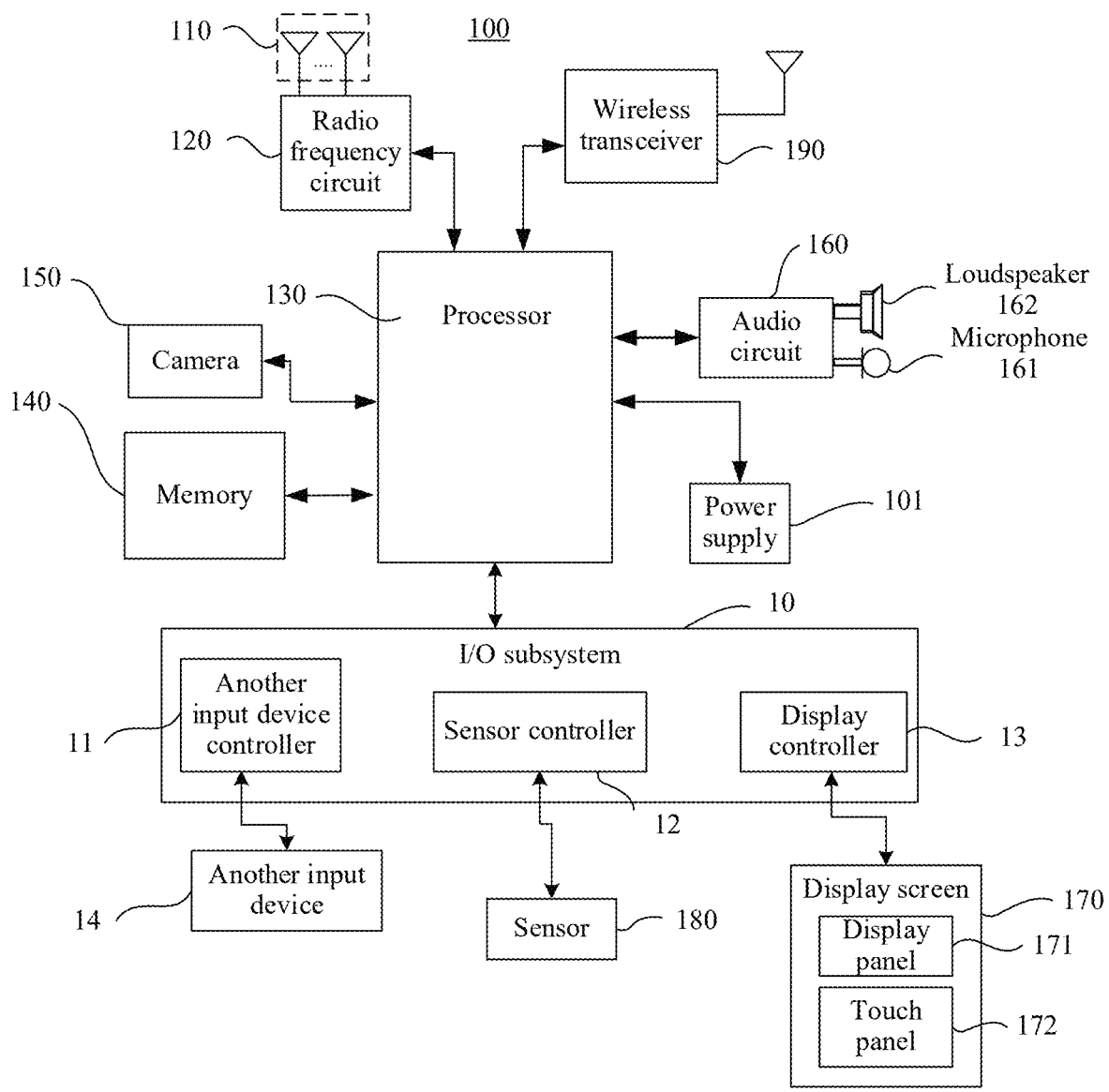
FIG. 6 is a schematic diagram of an example of an architecture of a terminal according to an embodiment of this application.

FIG. 6 is a schematic diagram of an example of an architecture of a terminal 100 according to an embodiment of this application. It should be understood that the terminal 100 may be the foregoing first terminal. In an optional case, an intelligent device may alternatively have a structure similar to that of the terminal 100. The terminal 100 may include an antenna system 110, a radio frequency (Radio Frequency, RF) circuit 120, a processor 130, a memory 140, a camera 150, an audio circuit 160, a display screen 170, one or more sensors 180, a wireless transceiver 190, and the like.

The antenna system 110 may be one or more antennas, or may be an antenna array including a plurality of antennas. The radio frequency circuit 120 may include one or more analog radio frequency transceivers, and the radio frequency circuit 120 may further include one or more digital radio frequency transceivers. The RF circuit 120 is coupled to the antenna system 110. It should be understood that, in embodiments of this application, coupling refers to a mutual connection in a specific manner, including a direct connection or an indirect connection through another device, for example, a connection through various interfaces, transmission lines, buses, or the like. The radio frequency circuit 120 may be used for various types of cellular wireless communication.

The processor 130 may include a communication processor, where the communication processor may be configured to control the RF circuit 120 to receive/send a signal by using the antenna system 110, and the signal may be a voice signal, a media signal, or a control signal. The processor 130 may include various general-purpose processing devices, for example, a general-purpose central processing unit (CPU), a system on chip (SOC), a processor integrated in the SOC, an independent processor chip, or a controller. The processor 130 may further include a dedicated processing device, for example, an application-specific integrated circuit (ASIC), a field programmable gate array (FPGA) or a digital signal processor (DSP), a dedicated video or graphics processing unit, a graphics processing unit (GPU), a neural network processing unit (NPU), and the like. The processor 130 may be a processor group including a plurality of processors, and the plurality of processors are coupled to each other through one or more buses. The processor may include an analog-to-digital converter (ADC) and a digital-to-analog converter (DAC), to implement signal connection between different components of the apparatus. The processor 130 is configured to process media signals such as an image, audio, and video.

The memory 140 is coupled to the processor 130. Specifically, the memory 140 may be coupled to the processor 130 by using one or more memory controllers. The memory 140 may be configured to store computer program instructions that include computer operating system (OS) and various user application programs. The memory 140 may be further configured to store user data, for example, graphics image data, video data, audio data, calendar information, contact information, or another media file obtained by rendering by an application program. The processor 130 may read the computer program instructions or the user data from the memory 140, or store the computer program instructions or the user data into the memory 140, to implement a related processing function. The memory 140 may be a non-volatile memory, for example, an eMMC (Embedded Multi Media Card), a UFS (Universal Flash Storage), a read-only memory (ROM), or another type of static storage device that can store static information and instructions, may be a volatile memory, for example, a random access memory (RAM), a static random access memory (SRAM), or other types of dynamic storage devices that can store information and instructions, or may be an electrically erasable programmable read-only memory (EEPROM), a compact disc read-only memory (CD-ROM) or other optical disk memory, an optical disk memory (including compact disc, laser disc, digital versatile disc, Blu-ray disc, or the like), a disk storage medium, or another magnetic storage device. The memory 140 is not limited thereto. Optionally, the memory 140 may be independent of the processor 130, or the memory 140 may be integrated with the processor 130.

The camera 150 is configured to collect an image or a video. For example, a user may trigger enabling of the camera 150 by using application program instructions, to implement a photographing or video shooting function, for example, photographing and obtaining a picture or a video of any scene. The camera may include components such as a lens, an optical filter, and an image sensor. The camera may be located in the front of the terminal device or on a back of the terminal device. A specific quantity and arrangement of cameras may be flexibly determined based on a requirement of a designer or a policy of a manufacturer. This is not limited in this application.

The audio circuit 160 is coupled to the processor 130. The audio circuit 160 may include a microphone 161 and a loudspeaker 162. The microphone 161 may receive sound input from the outside, and the loudspeaker 162 may play audio data. It should be understood that the terminal 100 may have one or more microphones and one or more headsets. A quantity of microphones and headsets is not limited in this embodiment of this application.

The display screen 170 is configured to provide a user with various display interfaces or various menu information that can be selected. For example, content displayed on the display screen 170 includes but is not limited to a soft keyboard, a virtual mouse, a virtual key, an icon, and the like. The display content is associated with a specific internal module or function. The display screen 170 may further accept user input. Optionally, the display screen 170 may further display information input by a user, for example, accept control information such as enabling or disabling. For example, after the terminal verifies that an intelligent device is valid, the terminal may display information such as a device ID, a device type, and a corresponding icon of the intelligent device on the display screen 170. An association result, a network connection result, and a registration result that are returned by the intelligent device may also be displayed on the display screen 170. Specifically, the display screen 170 may include a display panel 171 and a touch panel 172. The display panel 171 may be configured by using a liquid crystal display (LCD), an organic light emitting diode (OLED), a light emitting diode (LED) display device, a cathode ray tube (CRT), or the like. The touch panel 172, also referred to as a touchscreen, a touch-sensitive screen, or the like, may collect a contact or non-contact operation performed by a user on or near the touch panel 172 (for example, the operation may be an operation performed by the user on or near the touch panel 172 by using any suitable object or accessory such as a finger or a stylus, and may also include a somatosensory operation, where the somatosensory operation includes a single-point control operation, a multi-point control operation, and the like), and the touch panel 172 may drive a corresponding connecting device based on a preset program. Optionally, the touch panel 172 may include two parts: a touch detection apparatus and a touch controller. The touch detection apparatus detects a signal brought by a touch operation of a user, and transmits the signal to the touch controller. The touch controller receives touch information from the touch detection apparatus, converts the touch information into information that can be processed by the processor 130, then sends the information to the processor 130, and can receive and execute a command sent by the processor 130. Further, the touch panel 172 may cover the display panel 171. The user may perform an operation on or near the touch panel 172 based on content displayed on the display panel 171. After detecting the operation, the touch panel 172 transmits the operation to the processor 130 by using an I/O subsystem 10 to determine user input. The processor 130 then provides corresponding visual output on the display panel 171 through the I/O subsystem 10 based on the user input. Although in FIG. 6, the touch panel 172 and the display panel 171 are used as two independent components to implement input and output functions of the terminal 100, in some embodiments, the touch panel 172 and the display panel 171 are integrated.

The sensor 180 may include an image sensor, a motion sensor, a proximity sensor, an ambient noise sensor, a sound sensor, an accelerometer, a temperature sensor, a gyroscope, or other type of sensor, and combinations of various forms thereof. The processor 130 drives, by using the sensor controller 12 in the I/O subsystem 10, the sensor 180 to receive various information such as audio information, image information, or motion information, and the sensor 180 transmits the received information to the processor 130 for processing.

The wireless transceiver 190 may provide a wireless connection capability for another device, and the another device may be a peripheral device such as a wireless headset, a Bluetooth headset, a wireless mouse, or a wireless keyboard, or may be a wireless network, for example, wireless fidelity (Wireless Fidelity, Wi-Fi) network, a wireless personal area network (Wireless Personal Area Network, WPAN), or a WLAN thereof. The wireless transceiver 190 may be a Bluetooth-compatible transceiver, configured to wirelessly couple the processor 130 to a peripheral device such as a Bluetooth headset or a wireless mouse, or the wireless transceiver 190 may be a Wi-Fi-compatible transceiver, configured to wirelessly couple the processor 130 to a wireless network or another device.

The terminal 100 may further include another input device 14 that is coupled to the processor 130 to receive various user inputs, for example, an input number, a name, an address, and a media selection. The another input device 14 may include a keyboard, physical buttons (press button, rocker button, and the like), a dial, a slide switch, a joystick, a click wheel, and an optical mouse (The optical mouse is a touch-sensitive surface that does not display visual output, or an extension of a touch-sensitive surface formed by a touchscreen).

The terminal 100 may further include the foregoing I/O subsystem 10. The I/O subsystem 10 may include another input device controller 11, configured to receive a signal from the another input device 14, or send control or drive information of the processor 130 to the another input device 14. The I/O subsystem 10 may further include the sensor controller 12 and the display controller 13, and the sensor controller 12 and the display controller 13 are respectively configured to implement data and control information exchange between the sensor 180 and the processor 130 and between the display screen 170 and the processor 130.

The terminal 100 may further include a power supply 101, to supply power to other components including 110 to 190 of the terminal 100. The power supply may be a rechargeable or non-rechargeable lithium-ion battery or a nickel-hydrogen battery. Further, when the power supply 101 is a rechargeable battery, the power supply 101 may be coupled to the processor 130 by using a power management system, so that charging, discharging, power consumption adjustment, and the like are managed by using the power management system.

It should be understood that the terminal 100 in FIG. 6 is merely an example, and constitutes no limitation on a specific form of the terminal 100. The terminal 100 may further include other existing or future components that are not shown in FIG. 6.

In an optional solution, the RF circuit 120, the processor 130, and the memory 140 may be partially or completely integrated on one chip, or may be chips independent of each other. The RF circuit 120, the processor 130, and the memory 140 may include one or more integrated circuits disposed on a printed circuit board (Printed Circuit Board, PCB).

Figure 7:
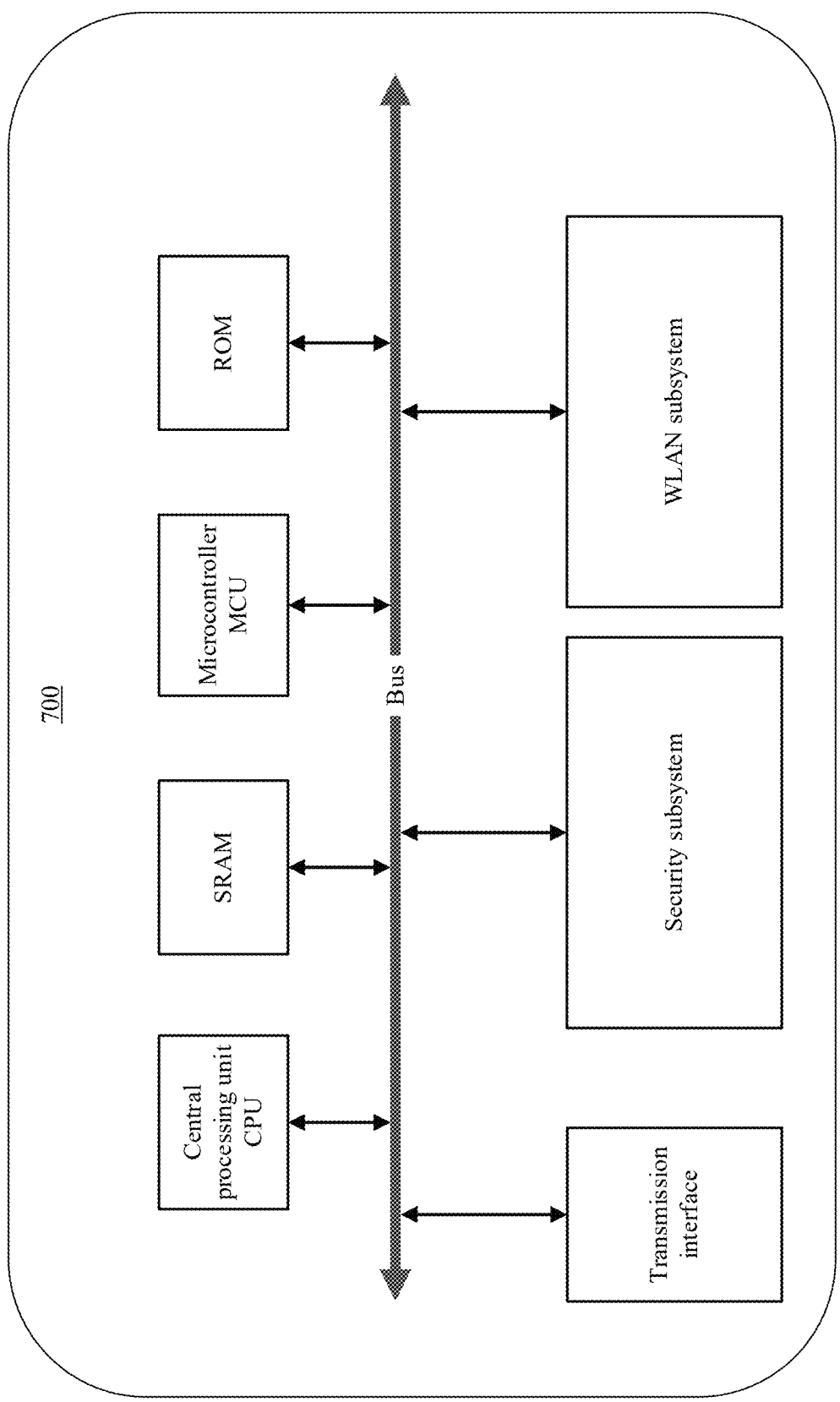
FIG. 7 is a diagram of an example of a hardware architecture of a network configuration apparatus according to an embodiment of this application.

FIG. 7 is a diagram of an example of a hardware architecture of a network configuration apparatus according to an embodiment of this application. For example, a network configuration apparatus 700 may be a processor chip on an intelligent device side, or may be a processor chip on a terminal side. The processor chip may be, for example, a Wi-Fi chip that implements communication.

Refer to FIG. 6. The apparatus 700 includes at least one CPU and a memory. A type of the memory may include, for example, an SRAM, a ROM, a microcontroller unit (Microcontroller Unit, MCU), a security subsystem, a WLAN subsystem, a bus, a transmission interface, and the like. Although not shown in FIG. 7, the apparatus 700 may further include another dedicated processor such as an application processor (Application Processor, AP), an NPU, and another subsystem such as a power management subsystem, a clock management subsystem, and a power consumption management subsystem.

The foregoing components of the apparatus 700 are coupled by using a connector. For example, the connector includes various interfaces, transmission lines, buses, and the like. These interfaces are usually electrical communication interfaces, but may also be mechanical interfaces or interfaces in other forms. This is not limited in this embodiment.

Optionally, the CPU may be a single-core processor (single-CPU) or a multi-core processor (multi-CPU). Optionally, the CPU may be a processor group including a plurality of processors, and the plurality of processors are coupled to each other through one or more buses. In an optional case, the CPU implements any network configuration method in the foregoing method embodiments by invoking program instructions stored in an on-chip memory or an off-chip memory. In an optional case, the CPU and the MCU jointly implement any network configuration method in the foregoing method embodiments. For example, the CPU completes some steps in the network configuration method, and the MCU completes other steps in the network configuration method. In an optional case, the AP or another dedicated processor implements any network configuration method in the foregoing method embodiments by invoking program instructions stored in an on-chip memory or an off-chip memory.

The transmission interface may be a data receiving and sending interface of the processor chip. The transmission interface usually includes a plurality of interfaces. In an optional case, the transmission interface may include an internal integrated circuit (I2C) interface, a serial peripheral interface (SPI), a universal asynchronous transceiver (UART) interface, a general-purpose input/output (GPIO) interface, and the like. It should be understood that these interfaces may implement different functions by multiplexing a same physical interface.

In an optional case, the transmission interface may further include a high definition multimedia interface (HDMI), a V-By-One interface, an embedded display port (eDP), a mobile industry processor interface (MIPI) or a display port (DP), and the like.

In an optional case, the foregoing components are integrated on a same chip. In another optional case, the memory may be an independent chip.

The security subsystem may be configured to implement the foregoing related encryption algorithms for performing security authentication on the intelligent device, such as the HMAC_SHA256 algorithm, the PBKDF2 algorithm, and the AES128 algorithm. The security subsystem may further check a device ID of the intelligent device, generate a first random number, and the like. It should be understood that an encryption algorithm related to security authentication is usually implemented by hardware, to further improve security of the encryption algorithm.

For example, the WLAN subsystem may include an RF circuit and a baseband. In the foregoing method embodiment, setting of a transmit distance, transmit power, a transmit frequency, receiver sensitivity, a CCA threshold, and the like may be implemented by using the WLAN subsystem. For example, the CCA threshold may be set by configuring a hardware register of the RF, and the receiver sensitivity may be set by configuring a baseband register. It should be understood that setting of at least some variables in the transmit distance, the transmit power, the transmit frequency, the receiver sensitivity, and the CCA threshold may require cooperation between the CPU and the WLAN subsystem.

A chip in this embodiment of this application is a system manufactured on a same semiconductor substrate by using an integrated circuit technology, and is also referred to as a semiconductor chip. The chip may be a set of integrated circuits formed on the substrate (which is usually a semiconductor material such as silicon) by using the integrated circuit technology, and an outer layer of the chip is usually packaged with a semiconductor packaging material. The integrated circuit may include various functional components. Each type of functional component includes a logic gate circuit, a metal oxide semiconductor (Metal-Oxide-Semiconductor, MOS) transistor, or a transistor such as a bipolar transistor or a diode, and may also include another part such as a capacitor, a resistor, or an inductor. Each functional component may independently operate or operate under action of necessary driver software, and may implement various functions such as communication, operation, or storage.

Figure 8:
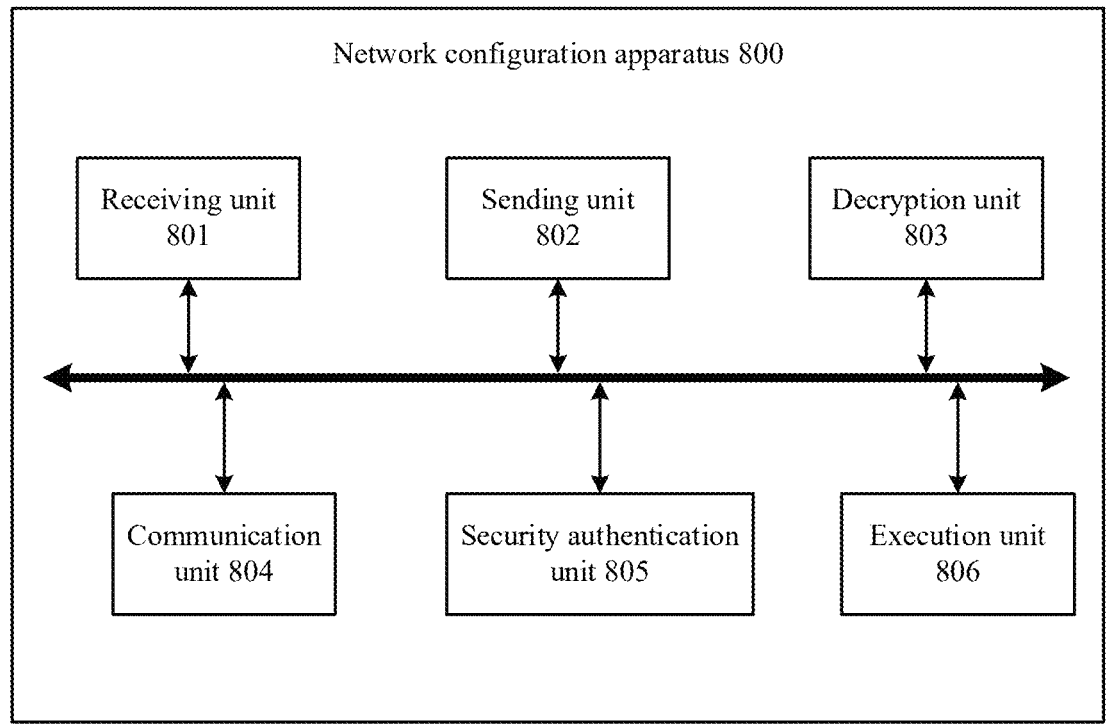
FIG. 8 is a schematic diagram of an example of a structure of a network configuration apparatus according to an embodiment of this application.

FIG. 8 is a schematic diagram of a structure of an example of a network configuration apparatus according to an embodiment of this application. The network configuration apparatus may be an intelligent device. In an optional case, the network configuration apparatus may be a communication chip, a Wi-Fi chip, or a processor configured to implement a network configuration function on the intelligent device. A network configuration apparatus 800 includes:

a receiving unit 801, configured to receive a first discovery packet broadcast by a first terminal; and a sending unit 802, configured to broadcast a first response packet in response to the first discovery packet, where the first response packet carries a device identifier ID of an intelligent device, and the device ID is used by the first terminal to verify validity of the intelligent device.

The receiving unit 801 is further configured to receive a network configuration packet broadcast by the first terminal, where the network configuration packet carries encrypted router-related information.

The network configuration apparatus 800 further includes a decryption unit 803, configured to decrypt the encrypted router-related information to obtain the router-related information, where the router-related information includes a service set identifier SSID and a password that are of a router; and a communication unit 804, configured to access the router based on the SSID and the password that are of the router.

It should be understood that the receiving unit 801 and the sending unit 802 may be implemented by the radio frequency circuit 120 and/or the wireless transceiver 190 in FIG. 6. Alternatively, the receiving unit 801 and the sending unit 802 may be implemented by the transmission interface in FIG. 7. The communication unit 804 may be implemented by the WLAN subsystem in FIG. 7.

In a possible implementation, the sending unit 802 is specifically configured to: in response to the first discovery packet, broadcast the first response packet in a short-distance transmission mode, where in the short-distance transmission mode, a sending distance of the first response packet does not exceed a first safe distance.

In a possible implementation, in the short-distance transmission mode, the apparatus 800 transmits the first response packet at first transmit power and a first transmit frequency, where the first transmit power is less than a preset transmit power threshold, and the first transmit frequency is greater than a preset frequency threshold.

In a possible implementation, in the short-distance transmission mode, receiver sensitivity of the apparatus 800 is reduced, and a clear channel assessment CCA threshold of the apparatus 800 is increased.

In a possible implementation, the apparatus 800 further includes a radio frequency RF register and a baseband register. In the short-distance transmission mode, a value of the RF register is set to reduce the receiver sensitivity of the apparatus, and a value of the baseband register is set to increase the CCA threshold of the apparatus. In an optional case, the RF register and the baseband register may be located in the WLAN subsystem in FIG. 7.

In a possible implementation, the first response packet carries the device ID of the intelligent device and a first encryption key that are in plaintext, and the first encryption key is used by the first terminal to encrypt the router-related information carried in the network configuration packet. The decryption unit 803 is specifically configured to decrypt the encrypted router-related information based on the first encryption key, to obtain the SSID and the password that are of the router.

In a possible implementation, the apparatus 800 further includes a soft access point SoftAP. Before the first discovery packet is received, a beacon frame is periodically broadcast through the SoftAP, where the beacon frame includes capability-related information of the apparatus. After the first discovery packet is received, the SoftAP is stopped from broadcasting the beacon message, and the short-distance transmission mode is entered.

In a possible implementation, after the router is accessed, the sending unit 802 is further configured to send registration information to a cloud device, where the registration information includes the device ID.

In a possible implementation, before receiving the network configuration packet broadcast by the first terminal, the receiving unit 801 is further configured to receive an authentication request packet sent by the first terminal, where the authentication request packet includes a first random number. The apparatus further includes: a security authentication unit 805, configured to generate a first matching key based on the first random number. The sending unit 802 is further configured to broadcast a second response packet, where the second response packet includes the first matching key, and the first matching key is used by the first terminal to verify validity of the apparatus.

The security authentication unit 805 may be the security subsystem in FIG. 7. Alternatively, the processor in FIG. 6 may implement a function of the security authentication unit 805.

In a possible implementation, before receiving the network configuration packet broadcast by the first terminal, the receiving unit 801 is further configured to receive a control packet sent by the first terminal, where the control packet carries encrypted control information. The decryption unit 803 is further configured to decrypt the encrypted control information to obtain the control information in plaintext. The apparatus further includes an execution unit 806, configured to perform an operation indicated by the control information in plaintext. The sending unit 802 is further configured to broadcast a third response packet, where the third response packet carries at least one of an execution result of the apparatus or status information of the apparatus.

For example, the decryption unit 803 may be included in the security subsystem in FIG. 7. Alternatively, the processor 130 in FIG. 6 may implement a function of the decryption unit 803.

Figure 9:
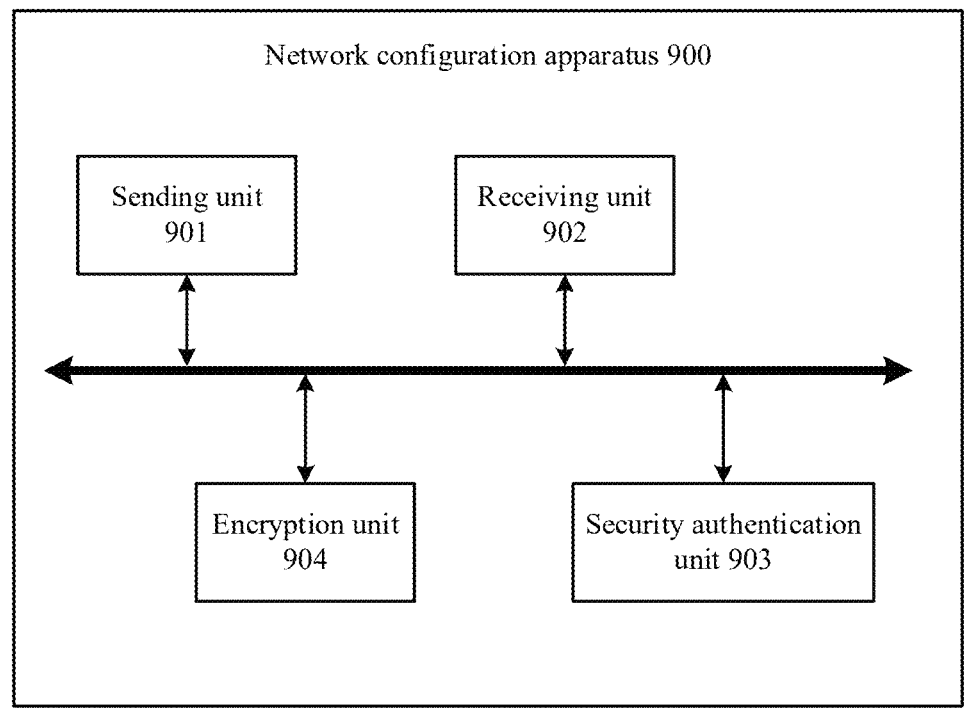
FIG. 9 is a schematic diagram of another example of a structure of a network configuration apparatus according to an embodiment of this application.

FIG. 9 is a schematic diagram of another example of a structure of a network configuration apparatus according to an embodiment of this application. The network configuration apparatus may be a terminal. In an optional case, the network configuration apparatus may be a communication chip on the terminal, a Wi-Fi chip, or a processor configured to implement a network configuration function. A network configuration apparatus 900 includes:

a sending unit 901, configured to broadcast a first discovery packet; a receiving unit 902, configured to receive a first response packet broadcast by a first intelligent device, where the first intelligent device is an intelligent device that receives the first discovery packet, and the first response packet carries a device identifier ID of the first intelligent device; and a security authentication unit 903, configured to perform validity authentication on the first intelligent device based on the device ID. The sending unit 901 is further configured to broadcast a network configuration packet, where the network configuration packet carries encrypted router-related information, and the router-related information includes a service set identifier SSID and a password that are of a router, where the SSID and the password that are of the router are used by the first intelligent device to access the router.

It should be understood that the receiving unit 902 and the sending unit 901 may be implemented by the radio frequency circuit 120 and/or the wireless transceiver 190 in FIG. 6. Alternatively, the receiving unit 801 and the sending unit 802 may be implemented by the transmission interface in FIG. 7. In an optional case, the security authentication unit 903 may be the security subsystem in FIG. 7. Alternatively, the processor in FIG. 6 may implement a function of the security authentication unit 903.

In a possible implementation, after it is determined that the device ID of the first intelligent device is valid, and before the network configuration packet is broadcast, the sending unit 901 is further configured to broadcast an authentication request packet, where the authentication request packet carries a first random number. The receiving unit 902 is further configured to receive a second response packet broadcast by the first intelligent device, where the second response packet carries a first matching key, and the first matching key is generated based on the first random number. The security authentication unit 903 is further configured to: generate a second matching password based on the first random number; and when the first matching key is equal to the second matching key, determine that the first intelligent device is valid.

In a possible implementation, after the first intelligent device is verified to be valid, the sending unit 901 is further configured to broadcast a control packet to the first intelligent device, where the control packet carries encrypted control information. The receiving unit 902 is further configured to receive a third response packet of the first intelligent device, where the third response packet carries at least one of an execution result of the first intelligent device or status information of the first intelligent device.

In a possible implementation, the receiving unit 902 is further configured to receive an association result fed back by the first intelligent device. After the first intelligent device is successfully associated with a user account, the sending unit 901 is further configured to send a control packet to the first intelligent device.

In a possible implementation, the receiving unit 902 is specifically configured to receive the first response packet within a range of a first safe distance from the first intelligent device, where the first response packet carries the device ID of the first intelligent device and a first encryption key that are in plaintext. The apparatus further includes an encryption unit 904, configured to: encrypt the router-related information based on the first encryption key; and encrypt the control information based on the first encryption key.

For example, the encryption unit 904 may be included in the security subsystem in FIG. 7. Alternatively, the processor in FIG. 6 may implement a function of the encryption unit 904.

In a possible implementation, information related to the intelligent device includes a device identifier ID of the intelligent device, and the sending unit 901 is further configured to send, to a cloud device, the device ID obtained based on the first response packet.

In a possible implementation, the receiving unit 902 is further configured to receive an association result fed back by the intelligent device. After the intelligent device is successfully associated with a user account, the sending unit 901 is further configured to send a control packet to the intelligent device.

In a possible implementation, when a distance from the intelligent device exceeds the first safe distance, the receiving unit 902 cannot receive the first response packet of the intelligent device.

It should be understood that the network configuration apparatus 800 shown in FIG. 8 is further configured to implement the method embodiment corresponding to FIG. 5A and FIG. 5B. The receiving unit 801 is configured to perform steps S501, S503, S506, and S509. The sending unit 802 is configured to perform steps S502, S505, S512, and S513. The decryption unit 803 is configured to perform steps S507 and S510. The communication unit 804 is configured to perform step S508. The security authentication unit 805 is configured to perform step S504. The execution unit 806 is configured to perform step S511. In an optional case, the decryption unit 803 may be a part of the security authentication unit 805. In this case, the security authentication unit 805 is configured to complete security authentication such as decryption, device ID check, and key matching.

An embodiment of this application further provides a computer-readable storage medium. The computer-readable storage medium stores instructions. When the instructions are run on a computer or a processor, the computer or the processor is enabled to perform some or all functions in the methods provided in embodiments of this application.

An embodiment of this application further provides a computer program product including instructions. When the instructions are run on a computer or a processor, the computer or the processor is enabled to perform some or all functions in the methods provided in embodiments of this application.

The foregoing embodiments are merely intended for describing the technical solutions of this application, but not for limiting this application. Although this application is described in detail with reference to the foregoing embodiments, a person of ordinary skill in the art should understand that modifications to the technical solutions recorded in the foregoing embodiments or equivalent replacements to some technical features thereof may still be made, without departing from the scope of the technical solutions of embodiments of this application.

What is claimed is:
1. A method, comprising:
receiving a first discovery packet broadcast by a first terminal;
broadcasting a first response packet in response to receiving the first discovery packet, wherein the first response packet carries a device identifier (ID) of a second device and a first encryption key that are in plaintext, and the device ID is usable by the first terminal to verify validity of the second device;

receiving a network configuration packet broadcast by the first terminal, wherein the network configuration packet carries encrypted router-related information, the encrypted router-related information comprises a service set identifier (SSID) and a password of a router;

decrypting the encrypted router-related information using the first encryption key to obtain the SSID and the password of the router; and accessing the router based on the SSID and the password of the router.

2. The method according to claim 1, wherein broadcasting the first response packet in response to receiving the first discovery packet comprises:

in response to receiving the first discovery packet, broadcasting the first response packet in a short-distance transmission mode, wherein in the short-distance transmission mode, a sending distance of the first response packet does not exceed a first preset distance.

3. The method according to claim 2, wherein broadcasting the first response packet in the short-distance transmission mode comprises:

broadcasting the first response packet in the short-distance transmission mode at a first transmit power and a first transmit frequency, wherein the first transmit power is less than a preset transmit power threshold, and the first transmit frequency is greater than a preset frequency threshold.

4. The method according to claim 2, wherein in the short-distance transmission mode, a receiver sensitivity of the second device is reduced from a receiver sensitivity of the second device not in the short-distance transmission mode, and a clear channel assessment (CCA) threshold of the second device is increased from a CCA threshold of the second device not in the short-distance transmission mode.

5. The method according to claim 2, further comprising:

before the first discovery packet is received, periodically broadcasting a beacon frame by using a soft enabled access point (SoftAP), wherein the beacon frame comprises capability-related information of the second device; and after the first discovery packet is received, stopping the SoftAP from broadcasting the beacon frame, and entering the short-distance transmission mode.

6. The method according to claim 1, further comprising:

before receiving the network configuration packet broadcast by the first terminal, receiving an authentication request packet of the first terminal, wherein the authentication request packet carries a first random number; and broadcasting a second response packet, wherein the second response packet carries a first matching key, the first matching key is generated based on the first random number, and the first matching key is used by the first terminal to verify the validity of the second device.

7. The method according to claim 1, further comprising:

before receiving the network configuration packet broadcast by the first terminal, receiving a control packet broadcast by the first terminal, wherein the control packet carries encrypted control information;

decrypting the encrypted control information to obtain the control information in plaintext;

performing an operation indicated by the control information in plaintext; and broadcasting a third response packet, wherein the third response packet carries at least one of an execution result of the second device or status information of the second device.

8. A method, comprising:

broadcasting a first discovery packet;

receiving a first response packet broadcast by a second device, wherein the second device receives the first discovery packet, and the first response packet carries a device identifier (ID) of the second device and a first encryption key that are in plaintext;

performing validity authentication on the second device based on the device ID; and broadcasting a network configuration packet, wherein the network configuration packet carries encrypted router-related information, the encrypted router-related information is encrypted using the first encryption key, and the encrypted router-related information comprises a service set identifier (SSID) and a password that are of a router, and wherein the SSID and the password that are of the router are used by the second device to access the router.

9. The method according to claim 8, further comprising:

after determining that the device ID of the second device is valid, and before broadcasting the network configuration packet, broadcasting an authentication request packet, wherein the authentication request packet carries a first random number;

receiving a second response packet broadcast by the second device, wherein the second response packet carries a first matching key, and the first matching key is generated based on the first random number;

generating a second matching key based on the first random number; and when the first matching key is equal to the second matching key, determining that the second device is valid.

10. The method according to claim 9, further comprising:

after determining that the second device is valid, broadcasting a control packet to the second device, wherein the control packet carries encrypted control information; and receiving a third response packet of the second device, wherein the third response packet carries at least one of an execution result of the second device or status information of the second device.

11. The method according to claim 10, wherein receiving the first response packet broadcast by the second device comprises:

receiving the first response packet within a range of a first preset distance from the second device.

12. A method, comprising:

receiving, by a second device, a first discovery packet broadcast by a first terminal; and broadcasting, by the second device in response to receiving the first discovery packet, a first response packet in a short-distance transmission mode, wherein the first response packet carries a device identifier (ID) of the second device and a first encryption key that are in plaintext, wherein in the short-distance transmission mode, a sending distance of the first response packet does not exceed a first preset distance, and wherein the first encryption key is used by the first terminal to encrypt information to be sent to the second device, and the information to be sent to the second device comprises network configuration-related information.

13. The method according to claim 12, wherein in the short-distance transmission mode, the second device broadcasts the first response packet at a first transmit power and a first transmit frequency, the first transmit power is less than a preset transmit power threshold, and the first transmit frequency is greater than a preset frequency threshold.

14. The method according to claim 12, wherein in the short-distance transmission mode, a receiver sensitivity of the second device is reduced from a receiver sensitivity of the second device not in the short-distance transmission mode, and a clear channel assessment (CCA) threshold of the second device is increased from a CCA threshold of the second device not in the short-distance transmission mode.

15. The method according to claim 12, further comprising:
before the first discovery packet is received, periodically broadcasting a beacon frame by using a soft enabled access point (SoftAP), wherein the beacon frame comprises capability-related information of the second device; and
after the first discovery packet is received, stopping the SoftAP from broadcasting the beacon frame, and entering the short-distance transmission mode.

16. The method according to claim 12, further comprising:
after broadcasting the first response packet in a short-distance transmission mode, receiving a network configuration packet broadcast by the first terminal, wherein the network configuration packet carries the network configuration-related information encrypted based on the first encryption key, and the network configuration-related information comprises a service set identifier (SSID) and a password that are of a router;
decrypting the encrypted network configuration-related information based on the first encryption key, to obtain the SSID and the password that are of the router; and
accessing the router based on the SSID and the password that are of the router.

17. The method according to claim 12, further comprising:
after broadcasting the first response packet in a short-distance transmission mode, receiving an authentication request packet broadcast by the first terminal, wherein the authentication request packet comprises a first random number;
generating a first matching key based on the first random number; and
broadcasting a second response packet, wherein the second response packet comprises the first matching key, and the first matching key is used by the first terminal to verify validity of the second device.

18. The method according to claim 17, wherein the information to be sent to the second device further comprises control information, and, the method further comprises:
after validity authentication on the second device succeeds, and before accessing a router based on a service set identifier (SSID) and a password that are of the router, receiving a control packet broadcast by the first terminal, wherein the control packet carries the control information encrypted based on the first encryption key;
decrypting the control information based on the first encryption key, to obtain the control information in plaintext;
performing an operation indicated by the control information in plaintext; and
broadcasting a third response packet, wherein the third response packet carries at least one of an execution result of the second device or status information of the second device.

\* \* \* \* \*